United States Patent
Oesterling et al.

(10) Patent No.: US 11,087,571 B2
(45) Date of Patent: Aug. 10, 2021

(54) MONITORING QUALITY OF CARE AT VEHICLE

(71) Applicant: GENERAL MOTORS LLC, Detroit, MI (US)

(72) Inventors: Christopher L. Oesterling, Troy, MI (US); Peter B. Kosak, Northville, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 453 days.

(21) Appl. No.: 15/932,268

(22) Filed: Feb. 16, 2018

(65) Prior Publication Data
US 2019/0259227 A1     Aug. 22, 2019

(51) Int. Cl.
| | |
|---|---|
| *G07C 5/08* | (2006.01) |
| *G07C 5/00* | (2006.01) |
| *H04L 29/08* | (2006.01) |
| *G06Q 10/02* | (2012.01) |
| *G06Q 30/06* | (2012.01) |

(52) U.S. Cl.
CPC ........... *G07C 5/0866* (2013.01); *G06Q 10/02* (2013.01); *G06Q 30/0645* (2013.01); *G07C 5/008* (2013.01); *H04L 67/104* (2013.01)

(58) Field of Classification Search
CPC ...... G07C 5/0866; G07C 5/008; G06Q 10/02; G06Q 30/0645; H04L 67/104
See application file for complete search history.

(56) References Cited

U.S. PATENT DOCUMENTS

| | | | | |
|---|---|---|---|---|
| 6,006,148 A | * | 12/1999 | Strong | .................... G07B 15/00 |
| | | | | 701/32.3 |
| 6,141,610 A | * | 10/2000 | Rothert | .................. G07C 5/008 |
| | | | | 340/438 |
| 6,181,991 B1 | * | 1/2001 | Kondo | ................ G07F 17/0014 |
| | | | | 701/22 |
| 6,584,381 B2 | * | 6/2003 | Gehrke | ................... B60R 25/04 |
| | | | | 701/1 |
| 6,584,403 B2 | * | 6/2003 | Bunn | ..................... G07B 15/00 |
| | | | | 340/988 |
| 6,618,650 B1 | * | 9/2003 | Nakai | ................. G07F 17/0042 |
| | | | | 701/1 |
| 7,177,738 B2 | * | 2/2007 | Diaz | ...................... G06Q 10/06 |
| | | | | 701/29.3 |
| 7,245,997 B2 | * | 7/2007 | Kitao | ..................... B60R 25/00 |
| | | | | 340/426.13 |
| 7,343,306 B1 | * | 3/2008 | Bates | ..................... G06Q 40/08 |
| | | | | 701/32.4 |

(Continued)

*Primary Examiner* — Bhavesh V Amin
(74) *Attorney, Agent, or Firm* — Lorenz & Kopf LLP

(57) ABSTRACT

A system and method of monitoring a vehicle during a peer-to-peer (P2P) reservation of the vehicle, wherein the vehicle is a part of a P2P vehicle sharing network, the method including: establishing a vehicle reservation between a vehicle renter and a vehicle manager; sending an indication to the vehicle of the vehicle reservation; after sending the indication to the vehicle of the vehicle reservation, receiving vehicle monitoring information that includes information used to determine a quality of care of the vehicle renter during the vehicle reservation; and generating reporting information based on the vehicle monitoring information, wherein the reporting information reflects the quality of care of the vehicle renter during the reservation.

19 Claims, 4 Drawing Sheets

(56) References Cited

U.S. PATENT DOCUMENTS

| | | | | |
|---|---|---|---|---|
| 7,636,626 | B2* | 12/2009 | Oesterling | G06Q 30/0254 340/901 |
| 7,761,062 | B2* | 7/2010 | Mervine | G07F 17/0057 455/99 |
| 7,941,258 | B1* | 5/2011 | Mittelsteadt | G07C 5/0825 701/32.4 |
| 8,352,118 | B1* | 1/2013 | Mittelsteadt | G08G 1/20 701/34.4 |
| 8,577,703 | B2* | 11/2013 | McClellan | G07C 5/08 705/7.11 |
| 8,595,034 | B2* | 11/2013 | Bauer | G06Q 40/02 705/4 |
| 8,818,618 | B2* | 8/2014 | Follmer | G06Q 10/10 701/33.4 |
| 8,868,288 | B2* | 10/2014 | Plante | G07C 5/008 701/32.2 |
| 8,892,310 | B1* | 11/2014 | Palmer | G07C 5/008 701/41 |
| 8,892,341 | B2* | 11/2014 | McClellan | G09B 19/16 701/115 |
| 8,892,451 | B2* | 11/2014 | Everett | G06Q 10/0833 705/4 |
| 8,966,654 | B1* | 2/2015 | Kwak | G06F 21/6245 726/28 |
| 8,989,959 | B2* | 3/2015 | Plante | B60W 40/08 701/33.4 |
| 9,067,565 | B2* | 6/2015 | McClellan | G07C 5/0841 |
| 9,129,460 | B2* | 9/2015 | McClellan | G07C 5/008 |
| 9,293,042 | B1* | 3/2016 | Wasserman | G08G 1/09 |
| 9,308,879 | B2* | 4/2016 | Wright | B60R 16/037 |
| 9,373,201 | B2* | 6/2016 | Jefferies | B60R 25/2018 |
| 9,396,494 | B1* | 7/2016 | Saenglongma | H04L 67/10 |
| 9,440,605 | B2* | 9/2016 | Vadgama | G06Q 30/0645 |
| 9,499,128 | B2* | 11/2016 | Reh | B60R 25/24 |
| 9,501,878 | B2* | 11/2016 | Palmer | G11B 27/10 |
| 9,710,975 | B2* | 7/2017 | Jefferies | B60R 25/2018 |
| 9,738,156 | B2* | 8/2017 | Plante | G07C 5/008 |
| 9,761,067 | B2* | 9/2017 | Plante | G07C 5/085 |
| 9,858,621 | B1* | 1/2018 | Konrardy | G08G 1/096758 |
| 10,109,016 | B1* | 10/2018 | Saenglongma | H04L 67/10 |
| 10,339,732 | B2* | 7/2019 | Plante | G07C 5/085 |
| 10,471,828 | B2* | 11/2019 | Plante | G07C 5/085 |
| 10,726,495 | B1* | 7/2020 | Saenglongma | G06Q 20/322 |
| 10,831,859 | B2* | 11/2020 | Van Wiemeersch | G06Q 10/06 |
| 10,832,335 | B1* | 11/2020 | Floyd | G06Q 30/0609 |
| 2002/0099618 | A1* | 7/2002 | Stiberman | G06Q 30/02 705/307 |
| 2002/0186144 | A1* | 12/2002 | Meunier | G07B 15/00 340/4.6 |
| 2003/0095046 | A1* | 5/2003 | Borugian | B62D 53/12 340/576 |
| 2003/0120522 | A1* | 6/2003 | Uyeki | G06Q 10/02 705/5 |
| 2003/0125961 | A1* | 7/2003 | Janda | G06Q 10/087 705/307 |
| 2003/0182183 | A1* | 9/2003 | Pribe | G08G 1/22 705/13 |
| 2004/0176969 | A1* | 9/2004 | Fujinuma | G08G 1/20 705/5 |
| 2004/0260470 | A1* | 12/2004 | Rast | G06Q 10/083 701/300 |
| 2005/0060070 | A1* | 3/2005 | Kapolka | G07C 5/008 701/31.4 |
| 2005/0209746 | A1* | 9/2005 | Kish | G05B 23/0208 701/21 |
| 2006/0178949 | A1* | 8/2006 | McGrath | G06Q 50/26 705/26.1 |
| 2006/0287783 | A1* | 12/2006 | Walker | H04Q 9/00 701/31.4 |
| 2006/0293802 | A1* | 12/2006 | Kitao | B60R 25/305 701/2 |
| 2007/0093215 | A1* | 4/2007 | Mervine | G07F 17/0057 455/99 |
| 2008/0195428 | A1* | 8/2008 | O'Sullivan | G06Q 10/00 705/6 |
| 2008/0252487 | A1* | 10/2008 | McClellan | G08G 1/052 340/936 |
| 2008/0319602 | A1* | 12/2008 | McClellan | G07C 5/008 701/31.4 |
| 2011/0040692 | A1* | 2/2011 | Ahroon | G06Q 50/163 705/307 |
| 2011/0112717 | A1* | 5/2011 | Resner | G07C 5/085 701/31.4 |
| 2011/0213629 | A1* | 9/2011 | Clark | G06Q 10/02 705/5 |
| 2013/0200991 | A1* | 8/2013 | Ricci | G06F 3/04817 340/4.3 |
| 2013/0335213 | A1* | 12/2013 | Sherony | G08G 1/167 340/439 |
| 2014/0309842 | A1* | 10/2014 | Jefferies | G07B 15/00 701/31.5 |
| 2014/0379385 | A1* | 12/2014 | Duncan | G07C 5/008 705/4 |
| 2015/0092056 | A1* | 4/2015 | Rau | G06K 9/00791 348/148 |
| 2015/0286881 | A1* | 10/2015 | Chen | G06Q 30/0645 348/77 |
| 2015/0348407 | A1* | 12/2015 | Avegliano | G08G 1/0141 701/118 |
| 2015/0371153 | A1* | 12/2015 | Lohmeier | G06Q 40/025 705/5 |
| 2016/0027307 | A1* | 1/2016 | Abhyanker | G06Q 50/01 701/117 |
| 2016/0259341 | A1* | 9/2016 | High | A47F 13/00 |
| 2016/0267578 | A1* | 9/2016 | Gramenov | H04L 67/1097 |
| 2016/0321771 | A1* | 11/2016 | Liu | G01C 21/3438 |
| 2016/0357188 | A1* | 12/2016 | Ansari | G06K 9/00805 |
| 2016/0358108 | A1* | 12/2016 | Sadovsky | G06Q 10/02 |
| 2016/0363935 | A1* | 12/2016 | Shuster | G08G 1/0175 |
| 2017/0061812 | A1* | 3/2017 | Lahav | G09B 9/042 |
| 2017/0337573 | A1* | 11/2017 | Toprak | G07C 5/006 |
| 2017/0371608 | A1* | 12/2017 | Wasserman | G06Q 30/0261 |
| 2017/0372410 | A1* | 12/2017 | Fruhman | G06Q 30/0645 |
| 2017/0372431 | A1* | 12/2017 | Perl | G07C 5/008 |
| 2018/0075380 | A1* | 3/2018 | Perl | G06Q 50/30 |
| 2018/0091930 | A1* | 3/2018 | Jefferies | G07C 9/00896 |
| 2019/0073676 | A1* | 3/2019 | Wang | G06Q 40/025 |
| 2019/0259227 | A1* | 8/2019 | Oesterling | G06Q 30/0645 |

\* cited by examiner

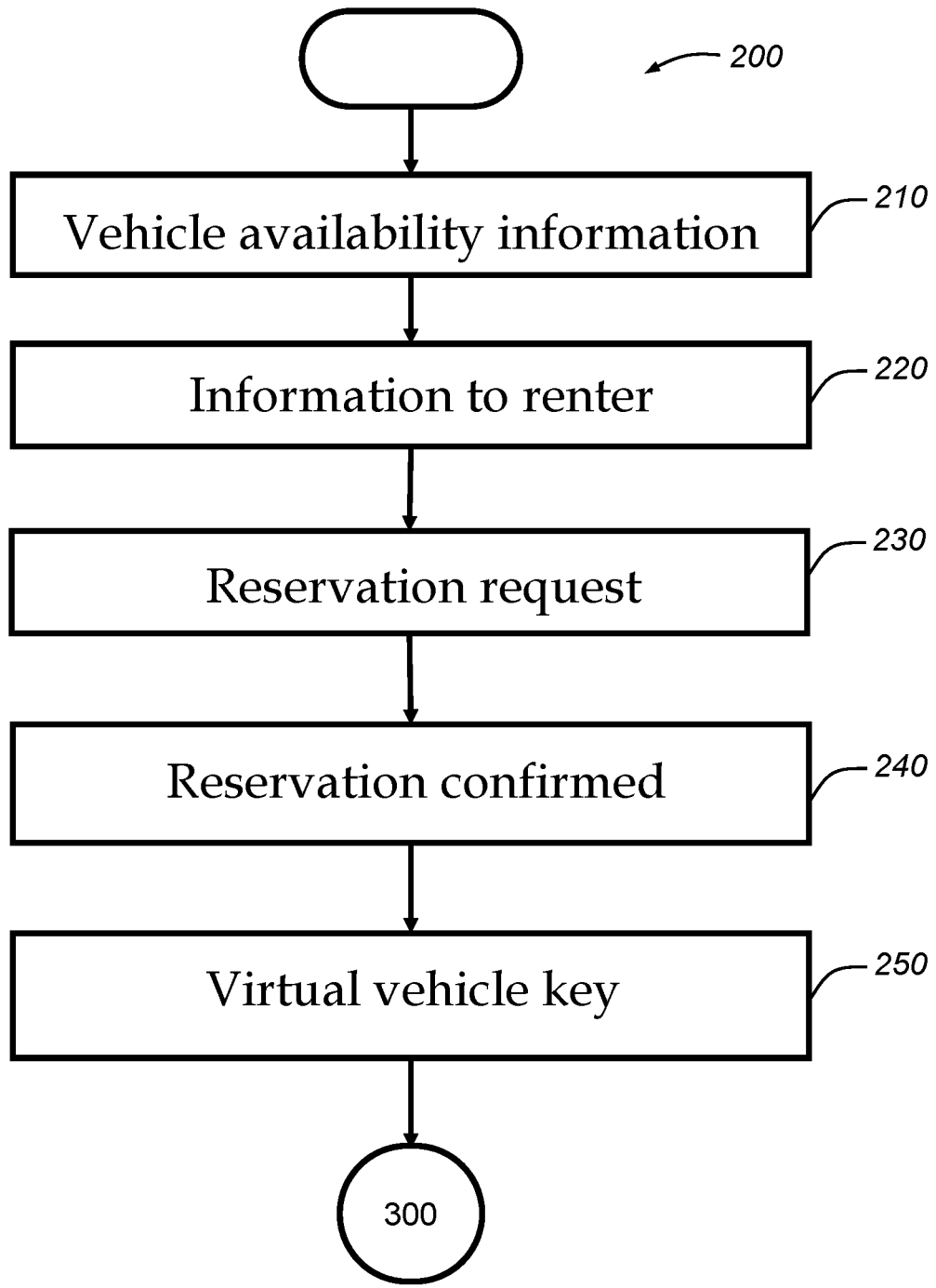

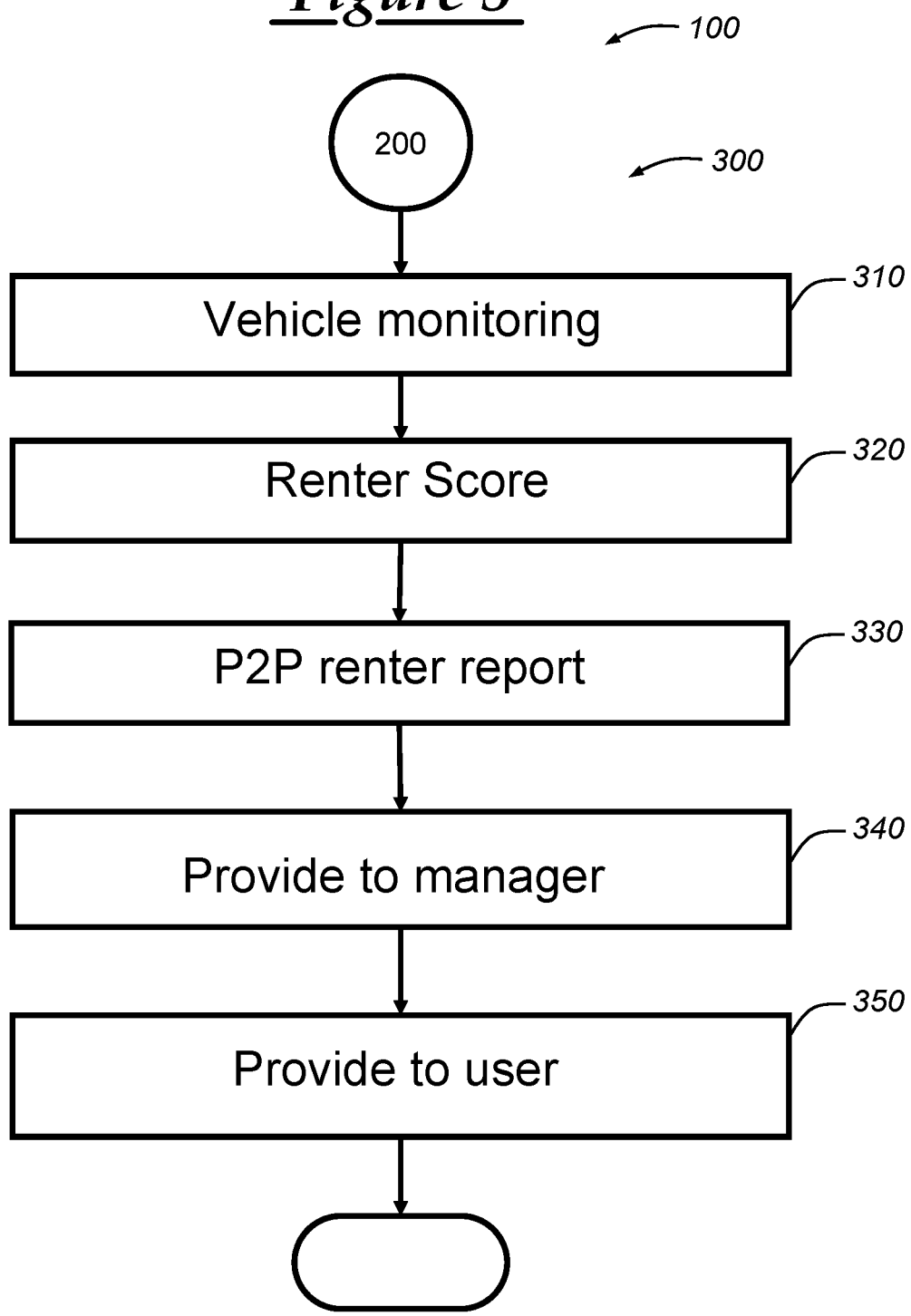

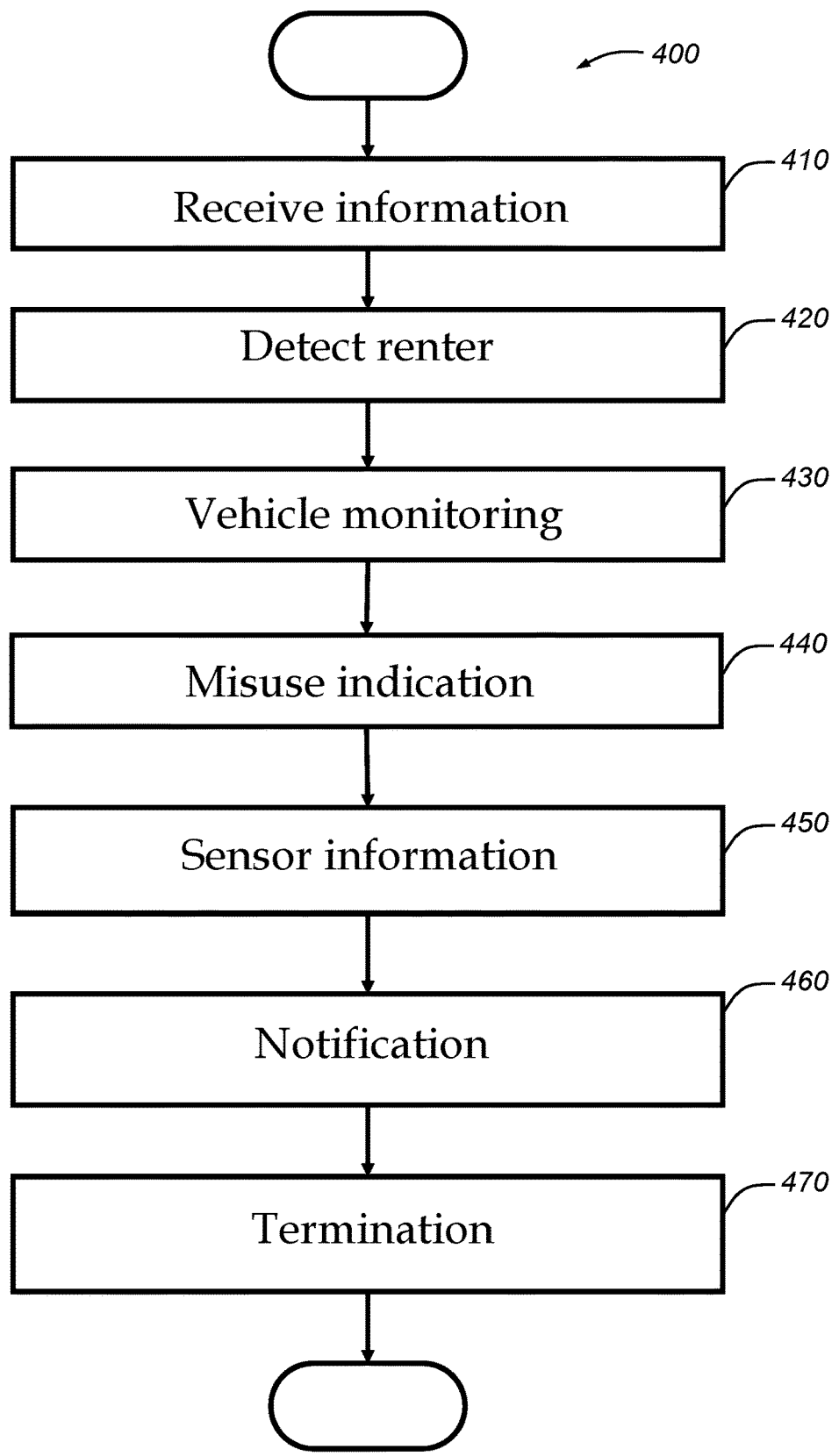

MONITORING QUALITY OF CARE AT VEHICLE

INTRODUCTION

The present invention relates to monitoring behavior of a user of a vehicle and reporting information concerning the user's behavior to an owner, a primary user, manager, or administrator of the vehicle or to a vehicle backend services facility.

Vehicles include hardware and software capable of obtaining and processing various information, including information that is obtained by vehicle system modules (VSMs). Moreover, vehicles include networking capabilities and can be connected to a vehicle backend server that maintains accounts for users and their vehicles. Users may allow another user to borrow their vehicle or to lease their vehicle. In such a scenario, the user may desire to be informed of the quality of care of their vehicle by the other user.

SUMMARY

According to one aspect of the invention, there is provided a method of monitoring a vehicle during a peer-to-peer (P2P) reservation of the vehicle, wherein the vehicle is a part of a P2P vehicle sharing network, the method including: establishing a vehicle reservation between a vehicle renter and a vehicle manager; sending an indication to the vehicle of the vehicle reservation; after sending the indication to the vehicle of the vehicle reservation, receiving vehicle monitoring information that includes information used to determine a quality of care of the vehicle renter during the vehicle reservation; and generating reporting information based on the vehicle monitoring information, wherein the reporting information reflects the quality of care of the vehicle renter during the reservation.

According to various embodiments, this method may further include any one of the following features or any technically-feasible combination of some or all of these features:
  communicating the reporting information to one or more users of the P2P vehicle sharing network;
  the reporting information is an independent vehicle renter score, and wherein the method further includes the step of updating a vehicle renter score based on the independent vehicle renter score;
  the reporting information is a vehicle renter report that is communicated to the vehicle manager;
  the vehicle monitoring information is obtained by the vehicle through use of a plurality of onboard vehicle sensors, and wherein the plurality of onboard vehicle sensors are configured to obtain sensor information;
  receiving vehicle availability information from a vehicle manager network device that indicates the availability of the vehicle in terms of location and time;
  receiving vehicle monitoring preferences and/or vehicle reservation constraints from a vehicle manager network device, and wherein the vehicle monitoring preferences and/or vehicle reservation constraints are communicated to the vehicle and used in a vehicle monitoring process that is used to obtain the vehicle monitoring information; and/or
  receiving an indication of vehicle misuse and, in response to receiving the indication of vehicle misuse, contacting a vehicle administrator and providing the vehicle administrator with vehicle monitoring information relating to the indication of the vehicle misuse.

According to another aspect of the invention, there is provided a method of monitoring a vehicle during a peer-to-peer (P2P) reservation of the vehicle, wherein the vehicle is a part of a P2P vehicle sharing network, the method including: determining an identity of a vehicle user at the vehicle; when it is determined that the vehicle user is a vehicle renter, carrying out a vehicle monitoring process that includes: obtaining sensor information from a plurality of onboard vehicle sensors that are installed in the vehicle, and determining vehicle monitoring information based on the obtained sensor information; and sending at least some of the vehicle monitoring information to a vehicle backend services facility.

According to various embodiments, this method may further include any one of the following features or any technically-feasible combination of some or all of these features:
  the vehicle monitoring process further includes determining whether vehicle misuse has occurred based on the sensor information or the vehicle monitoring information;
  when it is determined that vehicle misuse has occurred, obtaining supplemental sensor data, the supplemental sensor data being vehicle monitoring information that provides more and/or different types of information to evaluate the extent and/or the nature of the vehicle misuse;
  the step of obtaining supplemental sensor data includes obtaining image data of an interior area of the vehicle using an inward-facing camera that is installed in the vehicle;
  providing a notification to the vehicle renter informing the vehicle renter that their person is being recorded or that images or video is being obtained;
  when it is detected that vehicle misuse has occurred, automatically sending a subset of the vehicle monitoring information to the vehicle backend services facility at the time of the detection of the vehicle misuse, wherein the subset of the vehicle monitoring information includes any of the vehicle monitoring information that is relevant in assessing an extent and nature of the vehicle misuse, as well as any vehicle monitoring information that is relevant in assessing damage to the vehicle as a result of the vehicle misuse;
  the steps of: detecting the vehicle user's presence at or near the vehicle; and after detecting the vehicle user's presence at or near the vehicle, authenticating the vehicle user;
  it is determined that the vehicle user is a vehicle manager based on recognizing a vehicle key held by the vehicle user as being a physical or non-virtual key;
  when it is determined that the vehicle user is a vehicle manager, inhibiting operation of at least a portion of the vehicle monitoring process during use of the vehicle by the vehicle manager;
  the vehicle monitoring information is determined by a central vehicle computer of the vehicle based on the obtained sensor information, and wherein the sensor information is obtained by the vehicle central computer via a communications bus mounted in the vehicle; and/or
  the central vehicle computer of the vehicle includes a portion of the vehicle's electronics that was integrated into the vehicle at the time of manufacture of the vehicle.

According to yet another aspect of the invention, there is provided a peer-to-peer (P2P) vehicle monitoring system, including: a server that includes a processor and computer-readable memory, the computer-readable memory storing a computer program; and a database that is accessible by the server, the database storing reporting information concerning P2P vehicle reservations; wherein the computer program, when executed by the processor, causes the server to: establish a vehicle reservation between a vehicle renter and a vehicle manager; send an indication to the vehicle of the vehicle reservation; after sending the indication to the vehicle of the vehicle reservation, receive vehicle monitoring information that includes information used to determine a quality of care of the vehicle renter during the vehicle reservation; and generate the reporting information based on the vehicle monitoring information, wherein the reporting information reflects the quality of care of the vehicle renter during the reservation.

BRIEF DESCRIPTION OF THE DRAWINGS

One or more embodiments of the invention will hereinafter be described in conjunction with the appended drawings, wherein like designations denote like elements, and wherein:

FIG. 2 is a flowchart of a first part of an embodiment of a method of monitoring a vehicle during a peer-to-peer (P2P) reservation of the vehicle;

FIG. 3 is a flowchart of a second part of the embodiment of the method of FIG. 2; and FIG. 4 is a flowchart of another embodiment of a method of monitoring a vehicle during a peer-to-peer (P2P) reservation of the vehicle.

DETAILED DESCRIPTION

Figure 1:
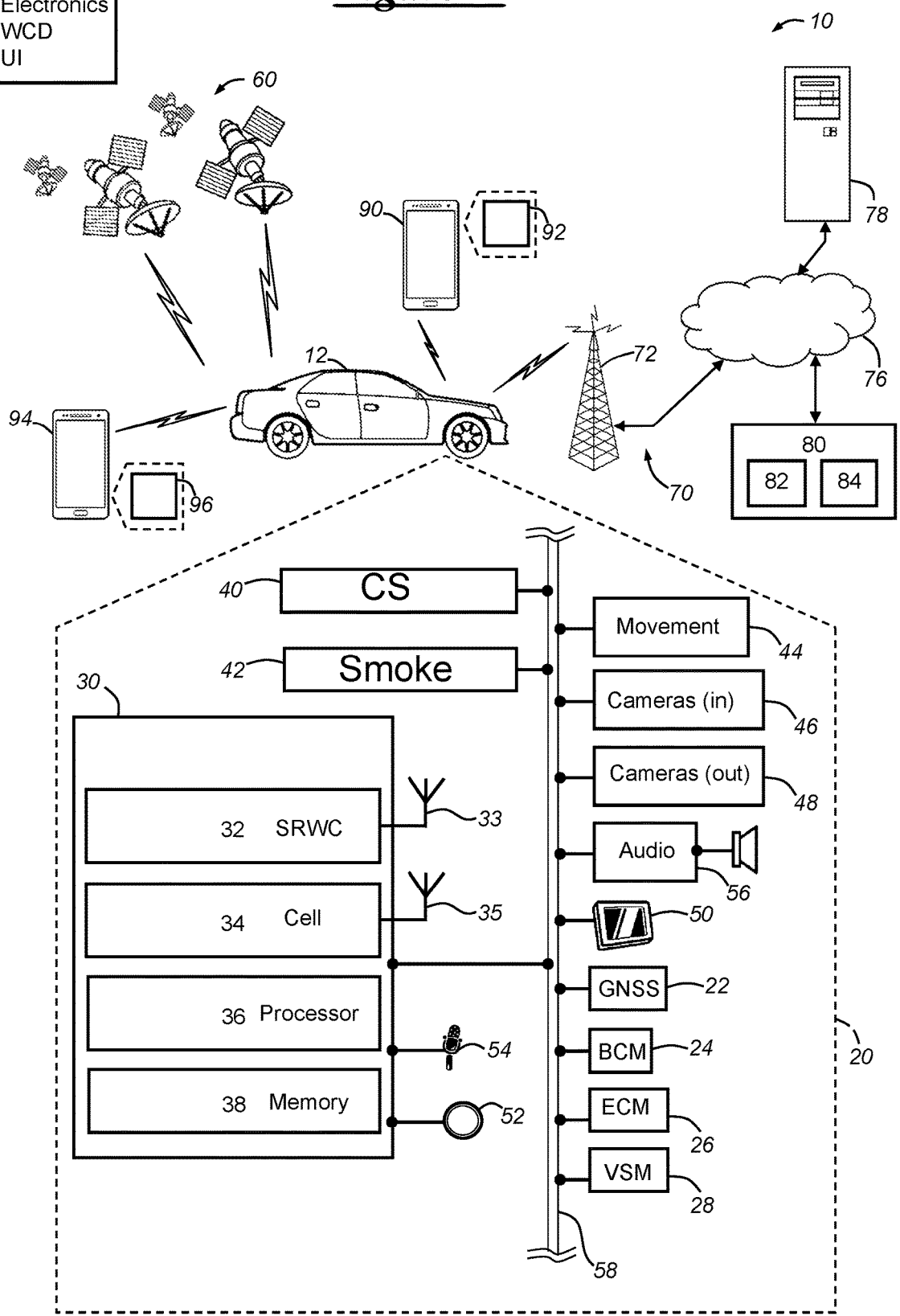
FIG. 1 is a block diagram depicting an embodiment of a communications system that is capable of utilizing the method disclosed herein.

The system and method described below enables monitoring the quality of care of a vehicle renter at a vehicle during a reservation. The system and method can be used with a peer-to-peer (P2P) vehicle sharing network that permits owners or their authorized agents (i.e., the vehicle managers) to rent out their vehicles to other users (i.e., the vehicle renters). A P2P vehicle manager can indicate the availability of the vehicle through sending vehicle availability information to a remote facility (e.g., a vehicle backend services facility) and, in response, the vehicle can be advertised for reservation or rental on a P2P vehicle renter application. The vehicle renter can then request to reserve the vehicle and the remote facility can then establish a reservation (or confirm the reservation). The remote facility can then issue a vehicle key, such as a virtual vehicle key, to the vehicle renter, which can be used to access and control the vehicle.

During the reservation, the vehicle manager may desire to obtain vehicle monitoring information or other information regarding the quality of care (QoC) of the vehicle renter during the reservation. The vehicle can use a variety of onboard vehicle sensors to obtain sensor information, which can ultimately be used to determine the QoC exercised by the vehicle renter during the reservation (i.e., the overall QoC). Vehicle monitoring information can be collected at the vehicle based on the sensor information and then sent to a remote facility, such as the one that established the reservation or another remote facility. The vehicle monitoring information can be used to determine the overall QoC. The overall QoC can then be used to modify or determine a vehicle renter score, which can represent the QoC exercised by the vehicle renter during all previous reservations (e.g., which is based on overall QoC of previous reservations and/or an initial QoC value assigned to new vehicle renters). The vehicle renter score can be communicated to various vehicle managers for consideration in determining whether to permit the vehicle renter to rent their vehicle.

The vehicle can obtain the vehicle monitoring information at a central vehicle computer of the vehicle. The central vehicle computer can be any of a number of vehicle system modules (VSMs), including a telematics unit, an infotainment unit, a body control module (BCM), or a wireless communications device. The central vehicle computer generally includes a processor and computer-readable memory. The central vehicle computer can be integrated into the vehicle electronics of the vehicle at the time of manufacture of the vehicle, or may be a standalone device that can be integrated with the vehicle electronics via a port of the vehicle (e.g., an onboard diagnostics II (OBD II) port, a universal serial bus (USB) port) or via a short-range wireless communication (SRWC) interface.

With reference to FIG. 1, there is shown an operating environment that comprises a communications system 10 and that can be used to implement the method disclosed herein. Communications system 10 generally includes a vehicle 12 with a wireless communications device 30 and other VSMs 22-56, a constellation of global navigation satellite system (GNSS) satellites 60, one or more wireless carrier systems 70, a land communications network 76, a computer or server 78, and a vehicle backend services facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as for providing peer-to-peer (P2P) vehicle sharing services to a plurality of vehicles and other electronic network computing devices, including vehicle 12 and personal mobile device 90. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicle 12.

Vehicle backend services facility 80 is a remote facility, meaning that it is located at a physical location that is located remotely from vehicle 12. The vehicle backend services facility 80 (or "remote facility 80" for short) may be designed to provide the vehicle electronics 20 with a number of different system back-end functions through use of one or more electronic servers 82 and, in many cases, may be a peer-to-peer (P2P) vehicle backend services facility that provides P2P vehicle backend services. The "P2P vehicle backend services" include managing and facilitating the establishment and execution of reservations, vehicle availability, vehicle permitted use parameters or conditions, P2P reporting services, P2P user account management, and various other services or functionality of the P2P vehicle sharing services. The vehicle backend services facility 80 includes vehicle backend services servers 82 and databases 84, which may be stored on a plurality of memory devices. Also, remote facility 80 can include one or more switches, one or more live advisors, and/or an automated voice response system (VRS), all of which are known in the art. Vehicle backend services facility 80 may include any or all of these various components and, preferably, each of the various components are coupled to one another via a wired or wireless local area network. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. In one embodiment, the servers 82 can execute a peer-to-peer (P2P) vehicle backend services application that enables various P2P vehicle sharing functionality, including the P2P vehicle backend services discussed above. This software may be stored in computer-readable memory such as any of the various types of RAM (random access memory) or ROM (read only memory). For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the backend facility 80 can store various information and can include a peer-to-peer (P2P) vehicle sharing database, geographical roadway information database, and other vehicle backend information database(s).

The P2P vehicle sharing database can include various information for use in the P2P vehicle backend services application and/or for other uses. The P2P vehicle sharing information can be stored on one or more P2P vehicle sharing databases, and can include user account information, vehicle reservation information, vehicle availability information, P2P reporting information, vehicle location information, vehicle monitoring information, and/or vehicle specification information.

The user account information can include various information for use in maintaining and facilitating the P2P vehicle sharing services network, such as account credentials (including username, password, other authentication/authorization information, facial recognition data, and/or other security information), P2P vehicle subscription information, and/or payment preferences and financial account information.

The vehicle availability information can include a vehicle availability indicator (i.e., an indicator that indicates whether the vehicle is available for reservation), vehicle availability parameters (i.e., desired or required parameters to be complied with when reserving the associated vehicle (or any vehicle associated with the user's account)), and other vehicle status information.

The P2P reporting information can include a vehicle renter score, which is a rating, score, grade, or other metric that represents the quality of the associated user as a user of the P2P vehicle sharing services network. Additionally or alternatively, the P2P reporting information can include a vehicle renter report that provides a summary or detailed information regarding the vehicle renter's behavior and/or notable vehicle operations.

The vehicle location information can include information representing the vehicle's location, including geographical coordinate information that is received from the vehicle and that is generated at the vehicle through use of global navigation satellite system (GNSS) services (e.g., through use of GNSS receiver 22). The vehicle monitoring information can include information pertaining to the P2P vehicle monitoring process discussed in more detail below, and can generally include information concerning the vehicle state and/or user behavior at the vehicle during a reservation period. In one embodiment, the vehicle monitoring information includes non-location information—that is, the vehicle monitoring information does not solely consist of vehicle location information.

The vehicle specification information can include information concerning specifications of the vehicle, such as make, model, model-year, standard features, optional features, aftermarket features, vehicle system module (VSM) information (e.g., vehicle sensor information), vehicle networking information (e.g., networking or user equipment (UE) information, including wireless subscriber information of a telematics unit or other UE, supported networking functionality, device identifiers and/or addresses), and various other information pertaining to a particular vehicle, such as the vehicle 12. It should be appreciated that any or all of the information stored in the P2P vehicle sharing database can be stored at one or more databases at one or more locations or facilities, and which may be operated and/or managed by one or more associated entities, including an OEM of the vehicles.

Additionally, in one embodiment, databases 84 can include geographical map information including geographical roadway map data that digitally represents geographical areas including roadways on the surface of earth. The geographical roadway map data includes data representing geographical regions including data representing roadways among the geographical regions. The geographical roadway map data can include various additional information, such as roadway dimensions and geometries (e.g., information representing geographical areas in which roadways are located), roadway attributes (e.g., speed limit, permitted direction of travel, lane information, traffic signal information), roadway conditions (e.g., present or estimated traffic conditions, predicted and/or observed weather conditions among the roadway), and various other information. Any of the geographic roadway map data can be associated with geographical coordinates or other location-identifying information that can be used to tie the data to a particular geographical point or area. Other information can be stored at the vehicle backend services facility 80, including account information such as vehicle services subscriber information (e.g., credentials and authentication information), vehicle identifiers, vehicle transactional information, geographical coordinates of the vehicle, and other vehicle information. Any or all of this information can be included and/or associated with information stored in the P2P vehicle sharing database(s), as discussed above.

The servers 82 can be used to provide the P2P vehicle sharing information as well as other information stored in the databases 84, including the geographical roadway map data, to a plurality of vehicles, including vehicle 12. Vehicle 12 can use this information to carry out a P2P vehicle monitoring process, as well as various other vehicle functionality. As mentioned above, although only a single vehicle backend services facility 80 is illustrated, numerous vehicle backend services facilities can be used and, in such a case, the functionality of the numerous vehicle backend services facilities can be coordinated so that the vehicle backend services facilities can act as a single backend network.

The personal short-range wireless communication (SRWC) devices 90 and 94 are mobile devices and may include: hardware, software, and/or firmware enabling SRWC as well as other personal (or mobile) device applications. In one embodiment, the personal SRWC devices 90, 94 can include a vehicle-device application 92, 96 and a global navigation satellite system (GNSS) receiver. According to various embodiments, the personal SRWC devices can include Android™, iOS™, Windows™ Phone, Windows™ Mobile, BlackBerry™, Tizen™, and/or other various operating systems. In one particular embodiment, the personal SRWC devices can be personal cellular SRWC devices that each include a cellular chipset and/or cellular connectivity capabilities, as well as SRWC capabilities. Using a cellular chipset, for example, the personal SRWC devices can connect with various remote devices, including computers 78 and remote server facility 80, via wireless carrier system 70. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. The hardware of SRWC mobile devices 90 may comprise: a processor and memory (e.g., non-transitory computer readable medium configured to operate with the processor) for storing the software, firmware, etc. The personal SRWC device's processor and memory may enable various software applications 92, 96, which may be preinstalled or installed by the user (or manufacturer) (e.g., having a software application or graphical user interface (GUI)).

As mentioned, the personal SRWC devices 90, 94 can include a processor and memory. The processor (or processing device) can be any type of device capable of processing electronic instructions including microprocessors, microcontrollers, host processors, controllers, and application specific integrated circuits (ASICs). The processor of the personal SRWC devices 90, 94 executes various types of digitally-stored instructions, such as software or firmware programs stored in memory of the personal SRWC device, which enable the devices 90, 94 to provide a wide variety of services. The memory of the personal SRWC device may include RAM, ROM, flash memory, solid-state memory, other temporary powered memory, any non-transitory computer-readable medium (e.g., EEPROM), or any other electronic computer medium that stores some or all of the software needed to carry out the various external device functions discussed herein.

One implementation of a vehicle-device applications 92, 96 may enable the personal SRWC device to carry out variations of the method discussed herein. In such a case, the vehicle-device applications 92, 96 can each be referred to as a peer-to-peer (P2P) vehicle sharing application. Alternatively or additionally, the vehicle-device applications 92, 96 (or another vehicle-device application) can enable a vehicle user to communicate with the vehicle 12 and/or control various aspects or functions of the vehicle, some of which are listed below. In one embodiment, the personal SRWC device 90 can be used to determine a location of the personal SRWC device. Such devices may communicate with wireless communications device 30 or with each other according to one or more SRWC technologies or wired connections, such as a connection using a Universal Serial Bus (USB) cable.

In one embodiment, the personal SRWC devices can include a GNSS receiver (not shown) that can be used to receive a plurality of GNSS signals from a plurality (or constellation) of GNSS satellites 60. The GNSS receiver can then use certain techniques to obtain a coordinate location of the personal SRWC device, which can include a latitudinal coordinate, a longitudinal coordinate, and/or an elevation coordinate or height. A more detailed discussion of a SRWC circuit 32 and a GNSS receiver 22, which are installed in the vehicle 12, is provided below and, to the extent such discussion is not inconsistent with the discussion of devices 90, 94 above, it is incorporated herein and hereby attributed to the personal SRWC devices 90, 94.

In one embodiment, the personal SRWC device 90 may be a P2P vehicle renter network device and can be used by a peer-to-peer (P2P) vehicle renter, which is a person that rented the vehicle 12 (i.e., reserved use of the vehicle 12 in exchange for payment or other consideration) from the P2P vehicle manager (e.g., owner, primary user of the vehicle 12) through use of the P2P vehicle sharing network. The renter's personal SRWC device 90 can be used to carry out a P2P vehicle sharing renter application 92 that can be used with the P2P vehicle sharing network, particularly for reserving a vehicle of the P2P vehicle sharing network, such as the vehicle 12. In one embodiment, the P2P vehicle sharing renter application 92 can be used to authenticate a user (e.g., the P2P vehicle renter), display available vehicles that can be reserved at the present time (or at a designated time), generate and send a P2P vehicle reservation request, receive a virtual vehicle key for the reserved vehicle (in response to the P2P vehicle sharing network accepting the reservation request and/or assigning a particular vehicle), send the virtual vehicle key to the vehicle 12 so as to gain access or control of the vehicle 12, monitor P2P vehicle renter behavior, generate or modify a vehicle renter score associated with the vehicle renter, and/or provide feedback to the P2P vehicle sharing network, such as to the P2P vehicle backend application, servers 82, or databases 84.

Additionally, the personal SRWC device 94 may be a P2P vehicle manager network device and can be used by a peer-to-peer (P2P) vehicle manager, which is a person that rented the vehicle 12 to the P2P vehicle renter through use of the P2P vehicle sharing network. The manager's personal SRWC device 94 can be used to carry out a P2P vehicle sharing manager application 96 that can be used with the P2P vehicle sharing network, particularly for advertising the availability of the vehicle 12 for reservation or rental. In one embodiment, the P2P vehicle sharing manager application 96 can be used to authenticate a user (e.g., the P2P vehicle manager), provide vehicle availability information, present P2P vehicle reservation requests, accept and send an acceptance of a vehicle reservation request, present the reporting information (e.g., vehicle renter score or vehicle renter report) of the P2P vehicle renter, receive contact details or other information of the P2P vehicle renter, receive updates or notifications concerning the reservation, receive vehicle monitoring information concerning the vehicle or the P2P vehicle renter during the reservation period, and/or receive a P2P vehicle reservation report based on the monitoring of the vehicle 12 during the reservation period.

The P2P vehicle sharing renter application 92 and the P2P vehicle sharing manager application 96 can be embodied in separate applications or computer programs, or may be embodied in a single application or computer program. In the latter case, the applications 92, 96 can then operate according to whether the user of the application is a P2P vehicle renter or a P2P vehicle manager—that is, for example, a single application can be installed on both devices 90 and 94, but can include different "modes" or functionality based on the status of the user in terms of the P2P vehicle sharing network (i.e., whether the user is a P2P vehicle renter or a P2P vehicle manager).

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) receiver 22, body control module or unit (BCM) 24, an engine control module (ECM) 26, other vehicle system modules (VSMs) 28, a wireless communications device 30, collision sensor(s) 40, smoke detector(s) 42, movement sensor(s) 44, inward-facing camera(s) 46, outward-facing camera(s) 48, and vehicle-user interfaces 50-56. Some or all of the different vehicle electronics may be connected for communication with each other via one or more communication busses, such as bus 58. Communications bus 58 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS receiver 22, BCM 24, ECM 26, wireless communications device 30, collision sensor(s) 40, smoke detector(s) 42, movement sensor(s) 44, inward-facing camera(s) 46, outward-facing camera(s) 48, and vehicle-user interfaces 50-56, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is preferably connected by communications bus 58 to the other VSMs, as well as to the wireless communications device 30, and can be programmed to run vehicle system and subsystem diagnostic tests. One or more VSMs 28 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites. GNSS receiver 22 can be configured to comply with and/or operate according to particular regulations or laws of a given geopolitical region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22.

GNSS receiver 22 may be used to provide navigation and other position-related services to the vehicle operator. Navigation information can be presented on the display 50 (or other display within the vehicle) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the vehicle communications device (or other telematics-enabled device) installed in the vehicle, wherein the position information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in a car sharing service including the P2P vehicle sharing service. Also, new or updated map data, such as that geographical roadway map data stored on databases 84, can be downloaded to the GNSS receiver 22 from the remote facility 80 via vehicle communications device 30.

Body control module (BCM) 24 can be used to control various VSMs of the vehicle, as well as obtain information concerning the VSMs, including their present state or status, as well as sensor information. BCM 24 is shown in the exemplary embodiment of FIG. 1 as being electrically coupled to communication bus 58. In some embodiments, the BCM 24 may be integrated with or part of a center stack module (CSM) and/or integrated with wireless communications device 30. Or, the BCM may be a separate device that is connected to other VSMs via bus 58. BCM 24 can include a processor and/or memory, which can be similar to processor 36 and memory 38 of wireless communications device 30, as discussed below. BCM 24 may communicate with wireless device 30 and/or one or more vehicle system modules, such as the engine control module (ECM) 26, collision sensor(s) 40, smoke detector(s) 42, movement sensor(s) 44, inward-facing camera(s) 46, outward-facing camera(s) 48, audio system 56, or other VSMs 28. BCM 24 may include a processor and memory accessible by the processor. Suitable memory may include non-transitory computer-readable memory that includes various forms of non-volatile RAM and ROM. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. For example, the BCM 24 can send signals to other VSMs, such as a request to perform a particular operation or a request for sensor information and, in response, the sensor may then send back the requested information. And, the BCM 24 may receive data from VSMs, including collision sensor information or other sensor data from collision sensor 40, smoke presence information from smoke detector 42, movement sensor information from movement sensor 44, image data from cameras 46 and/or 48, and various other information from other VSMs.

Additionally, the BCM 24 may provide vehicle state information corresponding to the vehicle state or of certain vehicle components or systems, including the VSMs discussed herein. For example, the BCM may provide the device 30 with information indicating whether the vehicle's ignition is turned on (as received from ECM 26, for example), the gear the vehicle is presently in (i.e. gear state), and/or other information regarding the vehicle. The sensor information and/or vehicle operating state information that is received or obtained at the BCM 24 can be used to monitor certain vehicle operations, as well as user or operator behavior. This monitoring may be carried out as part of the P2P vehicle monitoring process discussed below. The information can be sent to the wireless communications device 30 (or other central vehicle computer) automatically upon receiving a request from the device/computer, or automatically upon certain conditions being met, such as when the BCM recognizes vehicle misuse or other condition that may affect the overall quality of care (QoC) (i.e., the QoC of the vehicle renter during the reservation). As discussed in more detail below, the BCM can be configured with one or more triggers that, when a condition is satisfied, the BCM performs some operation, such as sending sensor information to the wireless communications device 30 (or to another device or entity, such as remote facility 80). In this way, the BCM 24 can filter information based on predetermined or predefined triggers and pass the filtered information on to other VSMs, including the wireless communications device 30 (or other central vehicle computer).

Engine control module (ECM) 26 may control various aspects of engine operation such as fuel ignition and ignition timing. ECM 26 is connected to communications bus 58 and may receive operation instructions from BCM 24 or other vehicle system modules, such as wireless communications device 30 or VSMs 28. In one scenario, the ECU 26 may receive a command from the BCM to start the vehicle—i.e., initiate the vehicle ignition or other primary propulsion system (e.g., a battery powered motor). The ECU 26 can also be used to obtain sensor information of the vehicle engine. In embodiments when the vehicle is a hybrid or electric vehicle, the ECU 26 can be used to obtain status information regarding the primary mover (including electrical motors and battery information).

The vehicle 12 includes various onboard vehicle sensors 40-48, as well as certain vehicle-user interfaces 50-54 that can be utilized as onboard vehicle sensors. Generally, the sensors 40-54 can use their respective sensor (or sensing device) to obtain information pertaining to either the operating state of the vehicle (the "vehicle operating state") or the environment of the vehicle (the "vehicle environmental state"). The sensor information can be sent to other VSMs, such as BCM 24 and the vehicle communications device 30, via communications bus 58. Also, in some embodiments, the sensor data can be sent with metadata, which can include data identifying the sensor (or type of sensor) that captured the sensor data, a timestamp (or other time indicator), and/or other data that pertains to the sensor data, but that does not make up the sensor data itself. The "vehicle operating state" refers to a state of the vehicle concerning the operation of the vehicle, which can include the operation of the primary mover (e.g., a vehicle engine, vehicle propulsion motors). Additionally, the vehicle operating state can include the vehicle state concerning mechanical operations of the vehicle—that is, the state of the mechanical operations of the vehicle. The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle. The sensor information can be used to determine the overall quality of care (QoC).

The collision sensors 40 can include one or more VSMs that are configured to sense information pertaining to or evidencing an impact or collision of the vehicle 12. The collision sensors can be dedicated devices for detecting collisions or impacts of the vehicle, or may be integrated into a sensor unit or device that is configured to obtain other information, such as movement information for movement sensors 44. In one embodiment, the collision sensors 40 can be mounted on the front of the vehicle (e.g., on or within a hood or front bumper), on the back of the vehicle (e.g., on or within a trunk or a back bumper), or on the sides of the vehicle 12. The collision sensors 40 can be connected to the communications 58 of the vehicle 12, and/or can be connected to an airbag module that, for example, provides an air cushion restraint system, as well as to other vehicle safety modules. The collision sensors 40 can send collision information back to the BCM 24 or other VSM, such as the wireless communications device 30.

The smoke detector 42 is an electronic device that includes a sensor that detects the presence of smoke. The smoke detector 42 can use a photoelectric or optical sensor, an ionization sensor, other sensor used in smoke detectors, and/or a combination thereof. Although the discussion herein refers to a single smoke detector 42, a plurality of smoke detectors 42 can be used. The smoke detector(s) 42 can be mounted on the vehicle in a variety of locations, such as within an interior vehicle cabin and/or within a trunk or other non-connecting cabin of the vehicle 12. The smoke detector 42 can be coupled to various other VSMs directly or via communications bus 58. Smoke detector sensor data can be obtained and sent to the other VSMs, including BCM 24 and/or wireless communications device 30.

The movement sensors 44 can be used to obtain movement or inertial information concerning the vehicle, such as vehicle speed, acceleration, yaw (and yaw rate), pitch, roll, and various other attributes of the vehicle concerning its movement as measured locally through use of onboard vehicle sensors. The movement sensors 44 can be mounted on the vehicle in a variety of locations, such as within an interior vehicle cabin, on a front or back bumper of the vehicle, and/or on the hood of the vehicle 12. The movement sensors 44 can be coupled to various other VSMs directly or via communications bus 58. Movement sensor data can be obtained and sent to the other VSMs, including BCM 24 and/or wireless communications device 30.

In one embodiment, the movement sensors can include wheel speed sensors that are each coupled to a wheel and that can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle. The wheel speed sensors can include a tachometer that is coupled to a vehicle wheel and/or other rotating member. In some embodiments, wheel speed sensors can be referred to as vehicle speed sensors (VSS) and can be a part of an anti-lock braking (ABS) system of the vehicle 12 and/or an electronic stability control program. As discussed more below, the electronic stability control program can be embodied in a computer application or program that can be stored on a non-transitory, computer-readable memory (such as that which is included in BCM 24 or memory 38). The electronic stability control program can be executed using a processor of BCM 24 (or processor 36 of the wireless communications device 30) and can use various sensor readings or data from a variety of vehicle sensors including sensor data from sensors 40-54.

Additionally, the movement sensors 44 can include one or more inertial sensors that can be used to obtain sensor information concerning the acceleration and the direction of the acceleration of the vehicle. The inertial sensors can be microelectromechanical systems (MEMS) sensor or accelerometer that obtains inertial information. The inertial sensors can be used to detect collisions based on a detection of a relatively high acceleration. When a collision is detected, information from the inertial sensors used to detect the collision, as well as other information obtained by the inertial sensors, can be sent to the wireless communication module 30 (or other central vehicle computer of the vehicle) and used in determining the quality of care. Additionally, the inertial sensor can be used to detect a high level of acceleration or braking. In one embodiment, the vehicle 12 can include a plurality of inertial sensors located throughout the vehicle. And, in some embodiments, each of the inertial sensors can be a multi-axis accelerometer that can measure acceleration or inertial force along a plurality of axes. The plurality of axes may each be orthogonal or perpendicular to one another and, additionally, one of the axes may run in the direction from the front to the back of the vehicle 12. Other embodiments may employ single-axis accelerometers or a combination of single- and multi-axis accelerometers. Other types of sensors can be used, including other accelerometers, gyroscope sensors, and/or other inertial sensors that are known or that may become known in the art.

The movement sensors 44 can also include a steering wheel angle sensor that is coupled to a steering wheel of vehicle 12 or a component of the steering wheel, including any of those that are a part of the steering column. The steering wheel angle sensor can detect the angle that a steering wheel is rotated, which can correspond to the angle of one or more vehicle wheels with respect to a longitudinal axis of vehicle 12 that runs from the back to the front. Sensor data and/or readings from the steering wheel angle sensor can be used in the electronic stability control program that can be executed on a processor of BCM 24 or processor 36.

The movement sensors 44 can include one or more yaw rate sensors that obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors.

And, additionally, the movement sensors 44 can include a throttle position sensor (TPS) that can be used to determine a position of a throttle device of vehicle 12. For example, the throttle position sensor can be coupled to an electronic throttle body or system that is controlled by an actuator (such as a gas pedal) via a throttle actuation controller. The TPS can measure throttle position in a variety of ways, including through using a pin that rotates according to the throttle position (e.g., the output of the throttle actuation controller) and that reads a voltage through the pin. The voltage through the pin can vary due to the pin's position, which varies the amount of resistance of the circuit and, thus, the voltage. This voltage data (or other data derived therefrom) can be sent to BCM 24, which can use such readings as a part of the electronic stability control program, as well as various other programs or applications. The movement sensors 44 can include various other sensors not explicitly mentioned here, including brake pedal position sensors and other sensors contributing to a change in movement (i.e., a change in direction or propulsion, as indicated by a sensor reading of a vehicle operation or as indicated by receiving an input that (typically) results in a change in direction or propulsion).

Cameras 46 and 48 can be an electronic digital camera that is powered through use of a vehicle battery. Cameras 46 and 48 may include a memory device and a processing device to store and/or process data that it captures or otherwise obtains. The data obtained by the cameras 46 and 48 may be sent to another vehicle system module (VSM) such as wireless communications device 30 and/or BCM 24. Cameras 46 and 48 may be of any suitable camera type (e.g., charge coupled device (CCD), complementary metal oxide semiconductor (CMOS), etc.) and may have any suitable lens known in the art. Some non-limiting examples of potential embodiments or features that may be used with cameras 46 and 48 include: infrared LEDs for night vision; wide angle or fish eye lenses; surface mount, flush mount, license mount, or side mount cameras; stereoscopic arrangements with multiple cameras; cameras integrated into tail lights, brake lights, or other components at the rear end of the vehicle; and wired or wireless cameras, to cite a few possibilities.

The cameras 46 and 48 can be used to capture photographs, videos, and/or other information pertaining to light, which is collectively referred to herein as image data. The image data can be represented in a pixel array and can be captured using interlacing or progressive scanning techniques. The image data can be captured at a set or pre-configured scanning or sampling frequency, and may be configured to obtain image data of a particular resolution. Once the image data is obtained through using the cameras 46 and 48, the image data can be processed and then sent to one or more other VSMs, including the wireless communications devices 30 and/or the BCM 24. The cameras 46 and 48 can include processing capabilities that enable image processing techniques, including object recognition techniques, to be carried out at the camera. Or, in other embodiments, the cameras may send raw or formatted image data to another VSM, such as device 30 (or other central vehicle computer), which can then perform the image processing techniques.

In one embodiment, multiple cameras can be positioned adjacent to one another and may be configured in a stereoscopic orientation such that video data is captured from multiple perspectives of an area and, when combined and processed according to a three-dimensional rendering algorithm, a three-dimensional reconstruction of the captured area may be rendered. A stereoscopic orientation refers to an orientation of multiple cameras such that their fields of view overlap thereby allowing multiple perspectives of the area to which their respective fields of view overlap.

One or more inward-facing cameras 46 can be installed and/or mounted on vehicle 12 and may be configured to face an area within an interior cabin of the vehicle 12, such as a passenger and/or operator cabin. In one embodiment, a first inward-facing camera 46 can be mounted on the vehicle such that the field of view of the camera faces a vehicle operator location (i.e., a location of the vehicle where an operator is positioned when properly operating the vehicle, such as in a driver's seat), while a second inward-facing camera can face a passenger location (e.g., front passenger seat, non-front-row vehicle seats). Additionally, multiple inward-facing cameras 46 can be positioned to face a particular area (e.g., the driver's seat) and, through using multiple cameras, multiple perspective or viewing angles of the particular area can be obtained, as well as stereoscopic information.

As mentioned above, the image data obtained by the inward-facing cameras 46 can be processed according to image processing techniques, including object recognition techniques. In one particular embodiment, a first inward-facing camera 46 can be positioned so that the field of view of the camera 46 includes the vehicle operator location, which can be a region where the vehicle user's face will most likely be located. In this way, the first inward-facing camera 46 can obtain image data of the vehicle user's face when the vehicle operator, which may be a peer-to-peer user of the vehicle 12 (e.g., a vehicle renter or vehicle manager). Thereafter, the image data of the vehicle user's face can be processed using various face recognition techniques so as to recognize certain facial features or indications of the vehicle user's behavior. For example, image data of the vehicle user's face can be obtained and then analyzed using certain image recognition (or processing) techniques to determine a direction that the vehicle user is looking or directing their field of view towards. In this way, the vehicle can monitor whether the vehicle user is keeping their eyes on the roadway in front of the vehicle 12 while operating the vehicle. In one scenario, the user may dose off or fall asleep and, thus, the vehicle monitoring system can detect the absence of the user's pupil. In another scenario, the vehicle can detect the location of the pupil with respect to the sclera of the user's eye (i.e., the whites of the user's eye), which can provide information concerning which direction the vehicle user is looking. Additionally, the camera can be used to recognize dilation of the user's pupils to determine a distance of an object or a scene that the user is focusing on and/or to determine whether the user has ingested certain drugs that enlarge the pupils. Moreover, dilation of ocular capillaries can be detected by identifying relatively high amounts of red color in the sclera of the user's eyes, which can indicate drug use including use of sensory-impairing drugs.

As mentioned above, the image data can be processed to recognize certain facial features of the vehicle user. The vehicle can then compare the recognized facial features of the vehicle user with facial recognition data (e.g., image data of the user's face, facial feature data) corresponding to the P2P user that reserved the vehicle 12. Thus, by receiving facial recognition data from, for example, the remote facility 80, and then comparing this data with the captured image data (or facial recognition data derived from the image data), the vehicle can determine whether the user of the vehicle (who is depicted in the image data captured at the vehicle 12 using camera 46) corresponds to the obtained facial recognition data from the remote facility 80. This facial recognition step can be used to authenticate that the operator of the vehicle is the P2P user that reserved the vehicle 12. Note, that in such a case, the facial recognition data of the P2P user can be stored at the P2P vehicle sharing databases that are maintained at the P2P vehicle backend services facility 80.

One or more outward-facing cameras 48 can be installed and/or mounted on vehicle 12. According to a particular embodiment, a first camera can be mounted on the left side of the vehicle 12 and a second camera can be mounted on the right side of the vehicle 12. Additionally, or alternatively, a third camera can be mounted on the front of the vehicle (or at least facing the area in front of the vehicle) and a fourth camera can be mounted on the back of the vehicle (or at least facing the area behind the vehicle). For example, the first and second camera can be mounted on a side mirror and can be arranged so as to capture an area of the roadway. The third camera can be mounted on the rearview mirror and facing an area in front of the vehicle and/or can be mounted on another portion of the front of the vehicle, including areas on the outside of the vehicle. The fourth camera can be mounted on a rear exterior portion of vehicle 12 and, in some embodiments, the fourth camera can be used as a backup camera (or reversing camera) that is already included as a part of many consumer vehicles, including cars and trucks, or that may be required by one or more laws or regulations, including those regulations of the National Highway Traffic Safety Administration (NHTSA) that requires certain vehicles to include a backup camera. In one embodiment, the outward-facing cameras 48 may be mounted on or embedded within a rear bumper of vehicle 12, a trunk or other rear door of vehicle 12, a tailgate (including those included in pickup trucks) of vehicle 12, a spoiler of vehicle 12, and/or any other location on vehicle 12 that is suitable for mounting or embedding camera 48 such that the field of view includes an area behind vehicle 12.

The outward-facing cameras 48 can be used to detect the vehicle environmental state, including the presence of other vehicles, the roadway conditions and features, and various other information. The image data obtained from the outward-facing cameras 48 can be used to obtain information concerning collisions, incidences where collisions almost occurred (e.g., the distance from the vehicle to other vehicles), and the presence and nature of other, nearby vehicles. For example, the outward-facing cameras 48 can use image recognition techniques to determine that an emergency vehicle (e.g., ambulance) is approaching the vehicle 12 from behind (such as through use of the fourth outward-facing camera) and this information can be used in conjunction with vehicle state information to determine the quality of care exercised in navigating out of the path of the emergency vehicle so as to not obstruct the emergency vehicle's path.

Additionally, the vehicle 12 can include other sensors not explicitly mentioned above, including parking sensors, lane change and/or blind spot sensors, lane assist sensors, ranging sensors (i.e., sensors used to detect the range between the vehicle and another object, such as through use of radar or lidar), tire-pressure sensors, fluid level sensors (including a fuel level sensor), brake pad wear sensors, V2V communication unit (which may be integrated into the wireless communications device 30, as discussed below), rain or precipitation sensors (e.g., infrared light sensor(s) directed toward the windshield (or other window of the vehicle 12) to detect rain or other precipitation based on the amount of reflected light), and interior or exterior temperature sensors.

Wireless communications device 30 is capable of communicating data via short-range wireless communications (SRWC) and/or via cellular network communications through use of a cellular chipset 34, as depicted in the illustrated embodiment. In one embodiment, the wireless communications device 30 is a central vehicle computer that is used to carry out at least part of the vehicle monitoring process. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In some embodiments, the wireless communications device 30 is a telematics unit (or telematics control unit) that is capable of carrying out cellular communications using one or more cellular carrier systems 70. The telematics unit can be integrated with the GNSS receiver 22 so that, for example, the GNSS receiver 22 and the wireless communications device (or telematics unit) 30 are directly connected to one another as opposed to being connected via communications bus 58.

In some embodiments, the wireless communications device 30 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

Wireless communications device 30 may enable vehicle 12 to be in communication with one or more remote networks (e.g., one or more networks at remote facility 80 or computers 78) via packet-switched data communication.

This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein, such as a peer-to-peer (P2P) vehicle monitoring application use to carry out a vehicle monitoring process. Memory 38 may be a temporary powered memory or any non-transitory computer-readable medium; these include different types of RAM (random-access memory) and ROM (read-only memory) that stores some or all of the software needed to carry out the various external device functions discussed herein. Similar components to those previously described (processor 36 and/or memory 38, as well as SRWC circuit 32 and cellular chipset 34) can be included in body control module 24 and/or various other VSMs that typically include such processing/storing capabilities.

The wireless communications device 30 can thus interface various VSMs of the vehicle 12 with one or more devices external to the vehicle 12. This enables various vehicle operations to be carried out and/or monitored by "extra-vehicle" devices (or non-vehicle devices), including the personal SRWC device 90 and the vehicle backend services facility 80. For example, the wireless communications device 30 can receive sensor data from one or more onboard vehicle sensors 40-54 and, thereafter, the vehicle can send this data (or other data derived from or based on this data) to other devices or networks, including the personal SRWC device 90 and the vehicle backend services facility 80. And, in another embodiment, the wireless communications device 30 can be incorporated with or at least connected to a navigation system that includes geographical map information including geographical roadway map data. The navigation system can be communicatively coupled to the GNSS receiver 22 (either directly or via communications bus 58) and can include an on-board geographical map database that stores local geographical map information. This local geographical map information can be provisioned in the vehicle and/or downloaded via a remote connection to a geographical map database/server, such as computer 78 and/or remote facility 80 (including servers 82 and databases 84). The on-board geographical map database can store geographical map information corresponding to a location or region of the vehicle so as to not include a large amount of data, much of which may never be used. Moreover, as the vehicle enters different locations or regions, the vehicle can inform the vehicle backend services facility 80 of the vehicle's location (e.g., obtained via use of GNSS receiver 22) and, in response to receiving the vehicle's new location, the servers 82 can query databases 84 for the corresponding geographical map information, which can then be sent to the vehicle 12.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information (e.g., monitoring information), which can be used to determine an overall QoC and, ultimately, reporting information, including a vehicle renter score or a vehicle renter report. The pushbutton(s) 52 allow manual user input into the communications device 30 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Additionally, the microphone 54 can be used as a decibel (db) noise level monitor (or sensor) that monitors the noise level in the vehicle. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Any one or more of these vehicle-user interfaces that can receive input from a user can be used to receive a driver override request, which is a request to cease operating the one or more VSMs as a part of the immersive media experience. Various other vehicle-user interfaces can also be utilized, as the interfaces of FIG. 1 are only an example of one particular implementation.

With reference to FIG. 2, there is shown a first part 200 of a method 100 of monitoring a vehicle during a peer-to-peer (P2P) reservation of the vehicle. Method 100 can be carried out by one or more servers 82 located at the vehicle backend services facility 80. Moreover, a network of servers 82 located at a plurality of vehicle backend services facility 80 can be used in conjunction with one another to carry out the method 100. However, various other embodiments exist, as will be apparent from the discussion below in light of the discussion of system 10 provided above.

The first part 200 of method 100 begins with step 210, vehicle availability information is received from a vehicle manager. In one embodiment where the method 100 is carried out as a part of a peer-to-peer (P2P) vehicle sharing network, the vehicle availability information can be received from a P2P vehicle manager. The vehicle availability information can include information indicating times when the vehicle 12 is available for reservation (including start and end times), a reservation or pickup location of the vehicle 12, a vehicle drop-off or return location, a P2P vehicle reservation price (or rate), vehicle monitoring preferences, vehicle reservation constraints, and other parameters concerning the availability of the vehicle, which can be based on the vehicle manager's own preferences or schedule. The vehicle reservation constraints can be one or more preferences or requirements indicated by the P2P vehicle manager that constrain use of the vehicle 12 during the reservation. For example, the vehicle reservation constraints can include a permitted vehicle operation area that defines an area or a region in which the vehicle 12 is permitted to be driven or operated within during the reservation. Another possible vehicle reservation constraint can be a maximum amount of miles that the vehicle is permitted to travel during the reservation. And, another possible vehicle reservation constraint can be whether the vehicle manager permits smoking or vaping in the vehicle. Other possible vehicle reservation constraints can be included as well.

In one embodiment, the vehicle availability information is received at the servers 82 of the vehicle backend services facility 80, which can be a P2P vehicle backend services facility. This information can be sent from a P2P vehicle sharing manager application 96 that is executed using the manager's personal SRWC device 94. Or, in another embodiment, the information can be sent by computer 78, which can be a personal computer of the manager, or can be sent from another P2P vehicle manager network device. The P2P vehicle manager network device can be any electronic computing device owned, operated, or used by the manager and that includes a processor, memory, and a network interface such that it can communicate with other network devices via the Internet or cloud, which can be accessed via cellular carrier system 70 and/or land network 76. Once the vehicle availability information is received at the vehicle backend services facility 80, the information can be stored in databases 84, such as in the P2P vehicle reservation database. The method 100 continues to step 220.

In step 220, the vehicle availability information is sent to a P2P vehicle renter network device. The P2P vehicle renter network device is similar in nature to the P2P vehicle manager network device, except that the P2P vehicle renter network device is usable by the P2P vehicle renter instead of the manager. It should be appreciated that, at this time, the P2P vehicle renter is a potential vehicle renter since a reservation has not yet been established; however, the potential vehicle renter will be referred to as a P2P vehicle renter. In one embodiment, the vehicle availability information is sent to the renter's personal SRWC device 90, which can execute the P2P vehicle sharing renter application 92. After this information is received, the application 92 can present this information to the vehicle renter via use of a graphical user interface (GUI) or other device-user interfaces. In a particular embodiment, the information can be presented over an image (or images) of a geographical map and at a location corresponding to location information included in the vehicle availability information.

In one embodiment, the vehicle availability information is sent by the servers 82 to the renter's personal SRWC device 90. This information can be sent from a P2P vehicle backend application that is executed using the servers 82. Or, in another embodiment, the information can be sent to a computer 78, which can be a personal computer of the manager, or can be sent to another P2P vehicle renter network device. Once the vehicle availability information is sent to the P2P vehicle renter network device, the information can be stored at the P2P vehicle renter network device and then presented via use of the application 92 as discussed above. The method 100 continues to step 230.

In step 230, a reservation request is received from the P2P vehicle renter. The request can be sent from the P2P vehicle renter network device that received the vehicle availability information, or from another P2P vehicle renter network device. The reservation request can include requested reservation parameters, such as requested or desired start time and end time of the reservation, a number of passengers, a route to be driven or traversed during the reservation, and various other information pertaining to the reservation. The reservation request can also include authentication/authorization information of the P2P vehicle renter, including a username and password. The reservation request can be received via any of those communication pathways discussed in step 220 above, including via cellular carrier system 70 and/or land network 76. Once the reservation request is received, the method 100 continues to step 240.

In step 240, the vehicle reservation is confirmed and/or established. This step can include communicating with the P2P vehicle manager network device (or application 96) to confirm that the vehicle is still available, since, in the interim period between steps 210 and 240, the P2P vehicle manager may have revoked the vehicle's availability and/or participation in the P2P vehicle sharing network. Such communications can be carried out using those communication pathways discussed above in step 210 between the vehicle backend services facility 80 and the P2P vehicle manager network device, such as the manager's personal SRWC device 94. Additionally or alternatively, this step can include verifying whether certain reservation parameters are satisfied, which can include, for example, determining whether the particular P2P vehicle renter had been "blocked" by the P2P vehicle manager such that the P2P vehicle renter is not allowed to rent the vehicle 12 of the P2P vehicle manager. Other verification can include verifying a received username and password of the vehicle renter, verifying the vehicle renter's present location (as determined by the device 90 using a GNSS receiver) in conjunction with the location of the reservation start location, verifying whether it is possible (or likely) that the vehicle 12 will be able to be located at the reservation start location at the reservation start time, and/or verification of various other information.

In one embodiment, the reservation request that was received in step 230 (or information contained or derived from the request) can be forwarded or sent to the P2P vehicle manager network device, such as personal SRWC device 94. The information of the reservation request can be presented to the P2P vehicle manager using the device 94, for example, and, then, the device 94 can receive a response (or confirmation) as to whether the request is accepted by the vehicle manager. The response can then be communicated back to the P2P vehicle backend services facility 80, which can then confirm or deny the request, including reporting such confirmation or denial to the P2P vehicle renter.

In another embodiment, the reservation request can be sent directly (or without going through the backend facility 80) from the P2P vehicle renter network device to the P2P vehicle manager network device. It should be appreciated that, in this embodiment, the reservation request may not be received at the remote facility 80 and, thus, step 230 may not be carried out in such an embodiment. In this way, communication resources can be reduced. The P2P vehicle manager can then indicate their acceptance or denial of the request, which can be communicated directly back to the P2P vehicle renter network device. At this point, the P2P vehicle backend services facility 80 can also be informed of the acceptance or denial. If the request is denied, the method 200 then ends.

In yet another embodiment, reservation information can be sent to the vehicle. This information can include a variety of information, including, for example, a virtual vehicle key, a reservation identifier, a vehicle renter identifier, a vehicle manager identifier, vehicle manager contact information, reservation start location, reservation end location, reservation start time, reservation end time, reservation geographical boundaries or limits, other vehicle reservation constraints, information of the renter's personal SRWC device, user account information pertaining to the vehicle renter and/or the vehicle manager, and/or vehicle monitoring preferences. The vehicle monitoring preferences can include preferences as to which devices are to be used to obtain vehicle monitoring information during the reservation, which type(s) of vehicle monitoring information is to be obtained during the reservation (e.g., audio information, image data, collision information, inertial information, location information), and other monitoring preferences. The vehicle monitoring preferences can also be included or used as a basis in forming the vehicle reservation constraints. The method 100 then proceeds to step 250.

In step 250, a virtual vehicle key is sent to the P2P vehicle renter. As used herein, the virtual vehicle key can be data, such as a string of bits or characters, that permits access or control of the vehicle when the virtual vehicle key is presented to the vehicle, such as via SRWC from the P2P vehicle renter network device. The virtual vehicle key can be a private encryption key, such as one that is generated or based on Advanced Encryption Standard (AES), and can be 128, 192, or 256 bits. In such a case, the vehicle 12 can include a complementary public (or private) key that corresponds to the virtual vehicle key and that is part of the same encryption scheme. The virtual vehicle key can also be generated at the time of reaching step 250 (such as after the reservation is confirmed).

In another embodiment, one or more virtual vehicle keys can be generated ahead of time, such as at a time before step 210. For example, upon the P2P vehicle manager declaring an intention to participate in the P2P vehicle sharing network using the vehicle 12, one or more virtual vehicle keys can be generated and stored at the databases 84, such as in the P2P vehicle sharing database. At this time, the one or more virtual vehicle keys can also be communicated to the vehicle 12 via cellular carrier system 70 and/or land network 76. In any of the embodiments discussed above, the virtual vehicle key can be encrypted before it is communicated and, then, decrypted at the receiving device using various encryption techniques and security protocols (e.g., Transport Layer Security (TLS)), such as those known in the art. The first part 200 of the method 100 then ends and the method 100 continues to the second part 300, which is illustrated in FIG. 3.

With reference to FIG. 3, there is shown a second part 300 of the method 100. In at least one embodiment, the second part 300 can be carried out after the beginning of a reservation start period, such as at the reservation start time or when an indication that the P2P vehicle renter has arrived and initiated the reservation process (i.e., the time when the P2P vehicle renter's presence is (ostensibly) detected at the vehicle). And, in at least one embodiment, the second part 300 can begin upon the vehicle receiving a notification that the P2P vehicle renter has arrived, that the vehicle renter has been authenticated (such as through use of the virtual vehicle key and/or facial recognition), and/or that the vehicle has been accessed.

The second part 300 of method 100 begins with step 310, wherein vehicle monitoring information is received at the vehicle backend services facility. The vehicle monitoring information can be information concerning the vehicle state and/or user behavior at the vehicle during the reservation period. This information can include vehicle operating state, which can be a variety of information relating to the vehicle's operation, and can include vehicle environmental state, which can be a variety of information relating to the interior of the cabin and the nearby, exterior area surrounding the vehicle. The vehicle monitoring information can be collected by a variety of vehicle system modules (VSMs), including onboard vehicle sensors 40-54.

In one embodiment, a vehicle status update can be periodically communicated to the vehicle backend services facility 80. The vehicle status update can include notable information concerning the ongoing reservation, including the vehicle's location, sensor information used for determining the quality of care, detected vehicle misuse (including the nature of the misuse or the sensor signals upon which the vehicle misuse detection is predicated), vehicle ignition/primary mover status, diagnostic trouble codes (DTCs) that came into being during the reservation, and/or other information that may be out of the ordinary and/or that can result in damage to the vehicle. The information contained in the vehicle status update can include various vehicle monitoring information. In one embodiment, some or all of the vehicle status update or vehicle monitoring information can be communicated to the P2P vehicle manager network device (e.g., personal SRWC device 94), including live location updates so that the P2P vehicle manager can track the location of the vehicle and the quality of care (QoC) exercised by the vehicle renter.

In some embodiments, when the vehicle status update indicates that the vehicle is experiencing a problem or that the P2P vehicle renter is misusing the vehicle (i.e., vehicle misuse is detected by the onboard sensors or other sensors at the vehicle), a P2P vehicle administrator can be notified at the vehicle backend services facility 80 or via the facility 80. The P2P vehicle administrator may be a support technician or other agent that is stationed at a remote facility (such as facility 80) and that can provide support to users of the P2P vehicle sharing network. Once the P2P vehicle administrator is notified, the P2P vehicle administrator can analyze the concerning information included in the vehicle status update. Additionally, the administrator can contact the P2P vehicle renter through initiating a call with the personal SRWC device 90 or the vehicle 12, such as via a connection to a telematics unit (or the wireless communication device 30). The vehicle renter can then communicate with the administrator using vehicle-device interfaces 50-56. Alternatively or additionally, the administrator can send a request to the vehicle for more information, such as status information relating to the vehicle operating state or the vehicle environmental state. And, in some embodiments, the administrator can send a command to the vehicle instructing the vehicle to perform a vehicle operation or function, such as autonomously pulling the vehicle 12 over to the side of the roadway on which the vehicle is traveling or located. In other embodiments, the P2P vehicle administrator can be a computer-implemented, automated application and can include use of interactive voice response techniques, including natural language understanding and natural language generation techniques. The method 100 then continues to step 320.

In step 320, a vehicle renter score can be determined based on the vehicle monitoring information. The vehicle renter score is a rating, score, grade, or other metric that represents or reflects the quality of the associated user (the P2P vehicle renter) as a renter of the P2P vehicle sharing services network. Accordingly, the vehicle renter score can reflect the past or historical quality of care (QoC) of reserved vehicles, feedback from the vehicle manager, and various other information that can be used to represent or reflect the quality of the vehicle renter as a participant in the P2P vehicle sharing network. The vehicle renter score can be calculated based on the overall QoC. The overall QoC can be based on a variety of relevant factors, including any or all of the vehicle monitoring information, including information contained in the vehicle status updates. Various scoring techniques can be employed, such as weighting techniques that weigh certain vehicle renter behavior or vehicle operations according to how detrimental (or beneficial) they are to the vehicle. For example, the overall QoC can be weighted based on the extent of damage caused or on the extent of a probable amount of damage that may result from the vehicle renter's use of the vehicle.

Additionally, an independent vehicle renter score can be generated and then used to modify or update the vehicle renter score. The independent vehicle renter score is a vehicle renter score that pertains only to use of the vehicle for the reservation period (and not for previous reservations) and can be the same as the overall QoC or derived from the overall QoC. In one embodiment, the vehicle manager can provide a manager-determined score that reflects the vehicle manager's impressions or reactions regarding the quality of the vehicle renter during or pursuant to the reservation. This manager-determined score can be incorporated and/or used as a basis in determining the independent vehicle renter score and/or the vehicle renter score. The vehicle renter score, the independent vehicle renter score, and/or the manager-determined score can be a part of the P2P reporting information discussed above and stored at the P2P vehicle sharing database of the P2P vehicle backend facility 80. The method 100 continues to step 330.

In step 330, a peer-to-peer (P2P) vehicle renter report is generated. The vehicle renter report can provide a summary or detailed information regarding the vehicle renter's behavior and/or notable vehicle's operations. In one embodiment, the vehicle renter report can include a textual summary of the vehicle's operation during the reservation period or during a period when the vehicle renter used the vehicle. Additionally, or alternatively, the vehicle renter report can include sensor data that is used to determine the overall QoC, such as image data, obtained from onboard vehicle sensors, such as the inward-facing cameras 46. In a particular embodiment, the vehicle may detect vehicle misuse (or potential vehicle misuse) and, thus, sensor information that is or was used as a basis in detecting the vehicle misuse (or potential vehicle misuse) can be included in the report. Additionally, other vehicle monitoring information (including sensor information from the onboard sensors 40-54) can be used to determine the overall QoC of the vehicle renter during the reservation, which can then be used as a basis in determining or calculating reporting information, including (an independent or overall) vehicle renter score and/or a vehicle renter report. Moreover, in at least one embodiment, the step of generating the vehicle renter report can include using a report template (such as a textual template with various dynamic fields) to translate the sensor information into representations whose meaning are ascertainable by the vehicle manager. The report template can include static portions and dynamic fields, where the dynamic fields can include information pertaining to the vehicle's operation or the vehicle renter's behavior during the reservation period and that are filled out during generation of the vehicle renter report based on the vehicle monitoring data. And, in one embodiment, the vehicle renter report can include the vehicle renter score and/or the independent vehicle renter score. The method 100 continues to step 340.

In step 340, the vehicle renter report can be sent to the vehicle manager. The vehicle renter report can be sent from the vehicle backend services facility 80 to the manager's personal SRWC device 94 via land network 76 and/or cellular carrier system 70. The vehicle renter report can be obtained at the P2P vehicle sharing manager application 96 and displayed using a user-device interface (e.g., a touchscreen display). The vehicle renter report can also be sent to the vehicle 12 and displayed using a variety of vehicle-user interfaces, including any of those discussed above. Additionally, in some embodiments, the vehicle manager can add comments or feedback to the vehicle renter report so as to supplement that report with any reactions or other remarks that the vehicle manager has regarding the vehicle renter. This feedback can also include the manager-determined score discussed above, as well as a variety of other information, such as specific comments or remarks regarding the reservation that may not or were not captured in the vehicle renter report. This feedback can then be provided to the vehicle backend services facility 80 for storage in a database and/or can be provided back the vehicle renter. The method 100 then continues to step 350.

In step 350, the vehicle renter score is provided to users of the P2P vehicle sharing network. In one embodiment, the vehicle renter score is associated with the vehicle renter, such as through storing the vehicle renter score in the databases 84 along with a user identifier that uniquely identifies the vehicle renter. Then, once an entity or device of the system 10 requests information regarding the vehicle renter, the vehicle renter score can be provided along with other information pertaining to the vehicle renter. In this way, other vehicle managers can view the vehicle renter's score so that a decision can be made as to whether to allow the vehicle renter to rent their vehicle. In at least one embodiment, the vehicle renter score can be provided to a manager's personal SRWC device 94 via land network 76 and/or cellular carrier system 70. And, the vehicle renter score can be obtained at the P2P vehicle sharing manager application 96 and displayed using a user-device interface (e.g., a touchscreen display). The second part 300 and the method 100 then ends.

With reference to FIG. 4, there is shown a method 400 of monitoring a vehicle during a peer-to-peer (P2P) reservation of the vehicle. Method 400 can be carried out by vehicle electronics 20 and, in many embodiments, can be carried out by a central vehicle computer. The embodiment of method 400 is generally discussed with reference to the wireless communications device 30 as the central vehicle computer, but the central vehicle computer that can be used to carry out at least a part of the method 400 can include a telematics unit, an infotainment unit, and/or body control module (BCM) 24. However, various other embodiments exist, as will be apparent from the discussion below in light of the discussion of system 10 provided above.

Method 400 begins with step 410, reservation information is received. The reservation information can include information relating to the reservation of the vehicle 12 by the vehicle renter. The reservation information can include any of that information discussed above with respect to step 240 of method 100 (FIG. 2). In one embodiment, the reservation information can include the virtual vehicle key (such as the one generated in step 250 of method 100), a reservation identifier, reservation start and end times and locations, vehicle manager contact information, and/or vehicle monitoring preferences. In another embodiment, the reservation information may not include a virtual vehicle key, but can include an indication of which pre-stored virtual vehicle key will be used during the reservation (e.g., see step 250 of method 100, which discusses pre-stored virtual vehicle keys). And, in another embodiment, the reservation information can include information of the renter's personal SRWC device, such as a device identifier (e.g., media access control (MAC) address, a Bluetooth™ device address (BD_ADDR), an internet protocol (IP) address, an International Mobile Subscriber Identity (IMSI)), device capabilities (e.g., supported SRWC protocols), and/or other device information (e.g., encryption keys or secrets used by the personal SRWC device for establishing a SRWC connection).

The reservation information can also include an indication that a reservation is being carried out using the vehicle 12. In many embodiments, the vehicle 12 is owned by a third party, meaning that the vehicle is not owned by an OEM (original equipment manufacturer) of the vehicle, or another associated business entity (e.g., a business entity primarily designed for managing vehicle fleets and leasing out those vehicles). In one example, the third party owner can be an individual that uses the vehicle 12 for their own personal use, but during times when the vehicle is not needed, rents out their vehicle 12 using the P2P vehicle sharing network discussed herein. In such an embodiment, the vehicle may desirably determine whether the vehicle user is the third party owner (e.g., the vehicle manager), or whether the vehicle user is the vehicle renter. In such a case, the indication of the reservation can be communicated to the vehicle from the vehicle backend services facility 80 or from another device. The vehicle monitoring process (steps 430 to 470) can then be carried out only during times when a reservation is occurring or during times when a vehicle manager is not using the vehicle. This information can be received from a vehicle backend services facility 80 via land network 76 and/or cellular carrier system 70. The method 400 continues to step 420.

In step 420, the vehicle renter is detected as being at or near the vehicle. In at least one embodiment, "at or near the vehicle" can refer to within a predetermined distance from the vehicle. And, in another embodiment, "at or near the vehicle" can refer to a distance in which the renter's personal SRWC device is within SRWC operating range of the vehicle 12 (or wireless communications device 30 of the vehicle 12). It should be appreciated that, in such an embodiment, "at or near the vehicle" can include various distances based on the wireless operating range of the particular SRWC protocol being used. In one embodiment, this detection can be made based on receiving a wireless message from the renter's SRWC device 90 via SRWC. Additionally, this can be based on the vehicle determining that the device which sent the wireless message is a device associated with the vehicle renter, such as through analyzing a device identifier received in the wireless message with that received from the vehicle backend services facility 80 (as included in the reservation information of step 410, for example). In one embodiment, the wireless message can be sent from the renter's personal SRWC device 90 in response to receiving a beacon message or signal from the communications device 30 of the vehicle 12. In other embodiments, the vehicle renter's presence can be detected through other vehicle sensors, including the BCM 24 that can determine when a vehicle door is opened or the vehicle doors are unlocked.

In one embodiment, once the vehicle renter is detected at or near the vehicle, a short-range wireless communication (SRWC) connection between the renter's personal SRWC device 90 and the wireless communications device 30 of the vehicle 12 can be established. This SRWC connection can be established using any of a variety of SRWC protocols, including any of those discussed above. In a particular embodiment, a Bluetooth™ connection is established using a pairing process and/or using a three- or four-way handshake. In one embodiment, a device identifier of the personal SRWC device 90 can be used to facilitate the pairing process and/or to authenticate the device 90.

Additionally, in one embodiment, once the vehicle renter's presence is detected and/or the SRWC connection is formed, the vehicle renter can be authenticated. For example, the authentication can include verifying that the vehicle renter (or the person who, at this point, appears to be the vehicle renter) is in fact the vehicle renter. For example, this authentication can be done through comparing reservation information received in step 410 with information received from the renter's personal SRWC device 90 via an SRWC connection. In a particular embodiment, the vehicle renter can be authenticated by the vehicle receiving a virtual vehicle key from the personal SRWC device 90 via, for example, the established SRWC connection. Or, in another embodiment, the reservation information can include a reservation code that can be inputted into the vehicle (or sent to the vehicle via the established SRWC connection).

In another embodiment, the user can be authenticated when the user enters the vehicle through use of facial recognition technology. As mentioned above, facial recognition data can be received as a part of the reservation information that is sent from the vehicle backend services facility 80 to the vehicle 12. The facial recognition data can then be compared with recognized facial features derived from image data captured by one or more inward-facing cameras 46 of the vehicle 12. This comparison can take place locally at the vehicle or may take place at a remote facility, which can include image data (or data representing the recognized facial features) to the remote facility (e.g., vehicle backend services facility 80). Upon the recognized facial features matching the facial recognition data, the vehicle renter can be authenticated. Various authentication techniques mentioned above can also be used.

In some scenarios, the vehicle monitoring process may not be necessary or desirable when the vehicle manager is using the vehicle or when a reservation is not being carried out. Thus, before beginning the vehicle monitoring process, the vehicle can determine whether the vehicle user is the vehicle manager (or the vehicle renter). This can be done by comparing a user of device identifier received from the personal SRWC device (received via, for example, step 420) with a device (or user) identifier of the vehicle renter's personal SRWC device 90 (as communicated to the vehicle in step 410). Or, in another embodiment, determining whether the vehicle user is a vehicle renter or a vehicle manager can be done by comparing the user or device identifier to a pre-stored device identifier or user identifier at the vehicle, which can be associated with the vehicle manager. When it is determined the vehicle user is a vehicle renter (or that the vehicle user is not the vehicle manager), the vehicle monitoring process can begin. The method 400 then continues to step 430.

In step 430, a vehicle monitoring process begins. The vehicle monitoring process can include obtaining sensor information at the vehicle and evaluating the sensor information to determine a quality of care (QoC) that the vehicle renter exercised during the reservation (i.e., an overall QoC). Additionally, at least in some embodiments, the vehicle monitoring process can evaluate the sensor information to determine whether vehicle misuse (or potential vehicle misuse) is present or whether any notable vehicle operating states or events are present (e.g., a collision, a new DTC). In one embodiment, the vehicle can use a set of triggers or conditions that are associated with (or that, when satisfied, indicate) vehicle misuse. These triggers or conditions can be based on sensor information that is to be obtained by one or more particular VSMs and, thus, the sensor information obtained by those particular VSMs can be evaluated in light of the triggers or conditions. The vehicle monitoring process can include collecting a variety of information, such as sensor information pertaining to those particular VSMs, vehicle location information, and/or data indicating compliance or non-compliance with vehicle constraints. This information can be reported back to the vehicle backend services facility 80. In one embodiment, the vehicle 12 can provide a notification via one or more vehicle-user device interfaces to inform the vehicle renter that they are being monitored.

In one embodiment, the monitoring process can include obtaining vehicle location information periodically and sending the obtained location information to the vehicle backend services facility 80, which can keep track of the vehicle 12 through storing the vehicle location information in the databases 84. The vehicle 12 can obtain the vehicle location information through using GNSS receiver 22, which receives a plurality of GNSS signals from the constellation of GNSS satellites 60. Any or all of the vehicle monitoring can be carried out using one or more VSMs, each of which can be connected via the communications bus 58 or other communicative coupling. A central vehicle computer on the vehicle, such as wireless communications device 30, BCM 24, or an infotainment unit (e.g., which can be incorporated with the device 30), may be used to carry out the evaluation of the sensor signals, including comparing the sensor information (or VSM states) to predefined conditions or triggers associated with vehicle misuse (or an indication of vehicle misuse) or notable vehicle events/states (or an indication of notable vehicle events or states). Additionally, predefined or predetermined sensor values, codes, and/or other sensor indications can be associated with a quality of care (QoC) metric so that certain sensor information can be mapped to a QoC metric, which can provide an objective basis for determining the QoC, which can ultimately be used as a basis in generating or determining reporting information. And, in some embodiments, certain VSMs may carry out this evaluation using their respective processing capabilities. The method 400 then continues to step 440.

In step 440, an indication of vehicle misuse is received. Vehicle misuse can include operational vehicle misuse and/or depreciative vehicle misuse. Operational vehicle misuse can include misuse relating to vehicle operations, including driving on the wrong side of the road (or in the wrong direction), driving without a seatbelt secured over the driver (or other passenger), driving at speeds over the maximum speed limit, accelerating the vehicle above an acceleration threshold, driving the vehicle outside a defined geographical boundary (e.g., which can be based on vehicle constraint parameters defined by the vehicle manger), non-compliance with other vehicle constraint parameters, distracted driving (e.g., fighting with another vehicle occupant, smoking or vaping, texting or other use of the personal SRWC device (without, for example, using hands-free features)), intoxicated driving (e.g., driving under the influence of alcohol or other sensory-impairing drugs), failing to signal when changing lanes, disobeying traffic signals and/or other road regulations or laws, etc. Depreciative vehicle misuse can include effecting a transformation in the physical nature of the vehicle in a depreciative manner, or in a manner that appears to be depreciative, including colliding the vehicle with another object, spilling a drink on the seat of the vehicle, breaking a vehicle component, leaving garbage or other articles in the vehicle that were not in the vehicle when the reservation began, etc. It should be appreciated that many types of vehicle misuse may be categorized as both operational vehicle misuse and depreciative vehicle misuse.

In one embodiment, the types of vehicle misuse discussed above (e.g., intoxicated driving) can each be associated with a single quality of care (QoC) amount that can be used in determining the QoC of the vehicle renter during the reservation (i.e., the overall QoC). For example, driving without wearing a seatbelt can be associated with a fixed or static QoC amount that, when factored in to the QoC determination, results in a lower overall QoC or QoC value (i.e., a value representing the overall QoC). Additionally, other types of vehicle misuse can be associated with a range of QoC amounts that can be used in determining the overall QoC. The extent of the vehicle misuse can thus be used to select an amount within the range of QoC amounts and this selected amount can then be used in determining the overall QoC. For example, distracted driving can be associated with a range of QoC amounts from 0 to 10, with 10 being the highest and the initial value used. The initial value (e.g., 10) can then be reduced when distracted driving is detected through evaluation of the sensor information. The amount of reduction can be based on or correlated to the amount of time that the distracted driving (or other vehicle misuse) is detected, the extent of damage caused to the vehicle as a result of the vehicle misuse, and/or the assessed damage risk (i.e., magnitude of damage weighted by (e.g., multiplied by) the probability of that damage as influenced by the extent and nature of the detected vehicle misuse). The extent and nature of the vehicle misuse can be determined through evaluating the vehicle state (e.g., the vehicle operating state and/or the vehicle environmental state) at the time of the vehicle misuse, which can provide a context for determining the extent and potential of harm due to the vehicle misuse. For example, when distracted driving is detected, the vehicle can then evaluate the present state of the vehicle, which can reflect the speed of the vehicle, the gear of the vehicle, and a variety of other information. Distracted driving while the vehicle is being propelled at high speeds can thus be associated with a greater reduction in the QoC amount (and, thus, the overall QoC) compared to distracted driving while the vehicle is in a parking gear and is not moving. In another example, the vehicle state can be used to determine whether a collision was the fault (or ostensibly the fault) of the vehicle renter. Certain vehicle state information can be used to make this determination, such as whether the vehicle is in a parking gear (or otherwise parked). The resulting QoC amount at the end of the reservation can then be used in determining the overall QoC. Moreover, during the reservation, the overall QoC (or overall QoC value) can be continuously updated and reported back to the vehicle backend services facility 80 and/or to the vehicle manager.

Alternatively or additionally, vehicle misuse may be determined based on the quality of care (QoC) falling below a predetermined threshold value. For example, the QoC can be represented as a numerical value that is initialized to a first predetermined value (i.e., an initial QoC value) at the start of the reservation (e.g., 100). Then, based on the evaluation of various sensor information during the vehicle monitoring process, the QoC value may drop below a predetermined threshold value (i.e., a vehicle misuse threshold value) and, accordingly, it can be determined that vehicle misuse exists. In one embodiment, the QoC value can be continuously updated by the vehicle (or by the vehicle backend services facility 80, assuming status updates including vehicle monitoring information is periodically communicated from the vehicle to the facility 80) and periodically compared to the vehicle misuse threshold value. Upon the QoC value dropping below the vehicle misuse threshold value, vehicle misuse can be said to be detected or an indication of vehicle misuse received.

In general, the vehicle can use the onboard sensors to obtain sensor information and then evaluate the information in conjunction with a set of triggers or conditions (e.g., predetermined vehicle states) to determine whether vehicle misuse has occurred. The vehicle can continuously be monitoring certain components or VSMs of the vehicle through sending a VSM status query message from the wireless communications device (or other central vehicle computer) to one or more VSMs via the communications bus 58 and, in response, receiving a VSM status message from the one or more VSMs, which can include a VSM state or sensor information obtained by the VSM. Alternatively or additionally, certain VSMs may be configured to periodically report their state and/or sensor information to the device 30 (or central vehicle computer).

For example, the operational vehicle misuse can include operating the vehicle in a manner such that roadway regulations or motor vehicle regulations are violated, including driving on the wrong side of the road (or in the wrong direction), driving at speeds over the maximum speed limit, driving irresponsibly (e.g., cutting through aisle in a parking lot or driving at fast speeds in a parking lot (even when no designated maximum speed limit exists for the parking lot), driving the vehicle outside a defined geographical boundary, driving off-road, etc. To determine vehicle misuse, the vehicle can obtain a geographical coordinate pair of the vehicle, obtain geographical roadway map data, and a vehicle state. The vehicle can then use the geographical coordinates to pinpoint the vehicle's location and, in conjunction with the geographical roadway map data, can determine a roadway and certain roadway features of the road at or near the vehicle's location. Then, the vehicle can evaluate vehicle state information to determine whether the vehicle is violating a roadway regulation and/or whether the vehicle is being otherwise being misused.

In another example, the vehicle can use outward-facing cameras 48 to determine a position of the vehicle within a roadway on which the vehicle is traveling. In this way, the vehicle can determine whether the vehicle renter is departing a lane without signaling, driving on the wrong side of the roadway, and/or driving too close to another vehicle (e.g., tailgating). And, in yet another embodiment, the vehicle can use the renter's personal SRWC device to determine whether the vehicle renter is operating their SRWC device (e.g., without using hands-free functionality) while also operating the vehicle. The method 400 continues to step 450.

In step 450, supplemental sensor data is obtained at the vehicle in response to the detection of vehicle misuse. The supplemental sensor data can be used to obtain more and/or different types of information that can be used to further evaluate the nature of the vehicle renter's behavior and/or vehicle misuse at the vehicle. In one embodiment, image data is captured using an inward-facing camera of the vehicle. For example, once vehicle misuse is detected, visual representations of the vehicle cabin and, particularly, of the vehicle renter, may be desirable so that the vehicle manager or P2P vehicle administrator can better ascertain the nature of the misuse, the extent of the misuse, and/or the reason for the misuse, as well as the present behavior of the vehicle renter. The image data can be obtained by the inward-facing camera 46, which can be positioned such that a field of view of the camera faces the vehicle renter (or a driver's seat of the vehicle 12). In one embodiment, the camera 46 can be initiated upon reaching step 450 such that at the time of detecting vehicle misuse (step 440), the camera 46 then begins capturing image data.

In another embodiment, the camera 46 may already be capturing image data. In such an embodiment, the camera may not need to be initiated at the time of the vehicle misuse detection (since it is already capturing image data). However, a time period can be defined in which image data will be reported back to the vehicle manager or the vehicle administrator. In one embodiment, the time period can include a start time and a duration (e.g., a length of time, until the occurrence of an event (e.g., end of reservation, departure of the vehicle renter from the vehicle 12)), or can include a start time and an end time. The start time can be the time when vehicle misuse is detected, or may be a predetermined amount of time before the vehicle misuse is detected so that the image data can depict the interior of the vehicle cabin when the vehicle misuse (and right before the vehicle misuse) is detected. In this way, the camera 46 may always be capturing image data during the vehicle monitoring process, storing the captured image data, and, then, deleting the stored image data after a predetermined time from when it was captured/stored so as to free-up memory. However, when vehicle misuse is detected, the vehicle can save the image data for the entire time period, including that image data that was captured before the detection of vehicle misuse. The vehicle can use various vehicle-user interfaces to notify the vehicle renter that images are being captured of their person. The method 400 continues to step 460.

In step 460, a notification can be sent to a remote device, such as the vehicle backend services facility 80 or the manager's personal SRWC device 94 (which, during the reservation, may not be located at the vehicle and deemed a remote device during this time). The notification can be sent at the time of detecting vehicle misuse and can include an indication that vehicle misuse is or was detected. In some embodiments, the notification can include the basis for the vehicle misuse detection, including the sensor data used in making this determination (and/or information conveying the nature of the sensor data so that a person can readily interpret such sensor information). In one embodiment, the notification can include or be accompanied by the captured image data from step 460. And, in a particular embodiment, a live-stream of the vehicle interior (or cabin) can be displayed at the remote device by streaming the captured image data.

In another embodiment, step 460 may be carried out prior to step 450 and in response to step 440 (detection of vehicle misuse). In this way, the sensor information (and/or information conveying the nature of the sensor data so that a person can readily interpret such sensor information) can be communicated to the vehicle administrator (or the vehicle manager), who can then determine whether supplemental information should or desirably should be obtained at the vehicle. Thus, when the administrator determines that supplemental information should be obtained, a supplemental monitoring information request can be generated and sent to the vehicle from, for example, the vehicle backend services facility 80. Upon receiving this message, the vehicle 12 can carry out step 450 and then report such information back to the vehicle backend services facility 80 and/or the vehicle administrator (or the vehicle manager). The method 400 then continues to step 470.

In step 470, the vehicle monitoring process ends or is terminated. In one embodiment, the vehicle monitoring process can end or be terminated when the reservation period ends (e.g., the occurrence of the end time of the reservation), when the vehicle is returned to the vehicle manager, and/or when the vehicle renter abandons or dispossesses the vehicle. At this time, sensor information that was obtained by the vehicle from the vehicle monitoring process can be sent back to the vehicle backend services facility 80 via one or more of the communication paths discussed above. The method 400 then ends.

In another implementation, the vehicle can determine whether a vehicle user is a vehicle renter or a vehicle manager based on authentication/authorization information that is received at the vehicle. For example, the method 400 can be carried out without step 410 and, at step 420, the vehicle can receive authentication/authorization information from a vehicle user at, for example, the time when the vehicle user is detected to be at or near the vehicle. The vehicle user can include a key, key fob, virtual key, or other vehicle entitlement code or device (collectively, the "vehicle key") that can be used to enable the vehicle user to operate the vehicle. The vehicle key can include certain information that identifies the user or identifies the vehicle key as being possessed by a particular person or entity, such as the vehicle manager or the vehicle renter. Or, in another embodiment, the mere fact that the vehicle key is a virtual key (e.g., which can be determined based on information communicated from the vehicle key) may result in a determination that the user is not the vehicle manager. Other implementations can be used to determine the identity of the vehicle user, such as through facial recognition techniques. When the vehicle determines that the vehicle user is the vehicle manager (or appears to be the vehicle manager), then the vehicle may forgo the vehicle monitoring process, or may disable certain features of the vehicle monitoring process and other related steps. For example, the inward-facing camera can be disabled or set to a state such that image data is not captured and/or reported. And, when the vehicle determines that the vehicle user is the vehicle renter (or appears to be the vehicle renter), then the vehicle may carry out the vehicle monitoring process and other related steps.

In one embodiment, the method 200, the method 300, the method 400, and/or parts thereof can be implemented in a computer program (or "application") embodied in a computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (e.g., memory at servers 82, memory 38 of the wireless communications device 30, memory of BCM 24, memory of an infotainment unit), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method of monitoring a vehicle during a peer-to-peer (P2P) reservation of the vehicle, wherein the vehicle is a part of a P2P vehicle sharing network, the method comprising:

establishing a vehicle reservation between a vehicle renter and a vehicle manager, wherein the vehicle renter is permitted to access and control the vehicle after the vehicle reservation;

sending an indication to the vehicle of a status of the vehicle reservation;

after sending the indication to the vehicle of the status of the vehicle reservation, receiving vehicle monitoring information that includes information used to determine a quality of care by the vehicle renter during the vehicle reservation; and generating and transmitting a report with reporting information after the vehicle reservation is over based on the vehicle monitoring information, wherein the reporting information reflects the quality of care of the vehicle renter during the reservation, including as to whether the vehicle renter has left garbage in the vehicle during the vehicle reservation.

2. The method of claim 1, further comprising the step of communicating the reporting information to one or more users of the P2P vehicle sharing network.

3. The method of claim 2, wherein the reporting information is an independent vehicle renter score, and wherein the method further comprises the step of updating a vehicle renter score based on the independent vehicle renter score.

4. The method of claim 2, wherein the reporting information is a vehicle renter report that is communicated to the vehicle manager.

5. The method of claim 1, wherein the vehicle monitoring information is obtained by the vehicle through use of a plurality of onboard vehicle sensors, and wherein the plurality of onboard vehicle sensors are configured to obtain sensor information.

6. The method of claim 1, further comprising the step of receiving vehicle availability information from a vehicle manager network device that indicates the availability of the vehicle in terms of location and time.

7. The method of claim 1, further comprising the step of receiving vehicle monitoring preferences and/or vehicle reservation constraints from a vehicle manager network device, and wherein the vehicle monitoring preferences and/or vehicle reservation constraints are communicated to the vehicle and used in a vehicle monitoring process that is used to obtain the vehicle monitoring information.

8. A peer-to-peer (P2P) vehicle monitoring system, comprising:

a server that includes a processor and computer-readable memory, the computer-readable memory storing a computer program; and a database that is accessible by the server, the database storing reporting information concerning P2P vehicle reservations;

wherein the computer program, when executed by the processor, causes the server to:

establish a vehicle reservation between a vehicle renter and a vehicle manager, wherein the vehicle renter is permitted to access and control the vehicle after the vehicle reservation;

send an indication to the vehicle of a status of the vehicle reservation;

after sending the indication to the vehicle of the status of the vehicle reservation, receive vehicle monitoring information that includes information used to determine a quality of care by the vehicle renter during the vehicle reservation; and generate and transmit a report with the reporting information after the vehicle reservation is over based on the vehicle monitoring information, wherein the reporting information reflects the quality of care of the vehicle renter during the reservation, including as to whether the vehicle renter has left garbage in the vehicle during the vehicle reservation.

9. The method of claim 1, wherein the information as to the quality of care further comprises sensor information as to whether the vehicle renter has violated one or more driving laws during the vehicle reservation in which the vehicle renter is in control of the vehicle.

10. The method of claim 9, wherein the information as to the quality of care further comprises sensor information as to whether the vehicle renter has driven on a wrong side of a road during the vehicle reservation in which the vehicle renter is in control of the vehicle.

11. The method of claim 9, wherein the information as to the quality of care further comprises sensor information as to whether the vehicle renter has failed to comply with traffic signals during the vehicle reservation in which the vehicle renter is in control of the vehicle.

12. The method of claim 9, wherein the information as to the quality of care further comprises sensor information as to whether the vehicle renter has failed to utilize a safety belt during the vehicle reservation in which the vehicle renter is in control of the vehicle.

13. The method of claim 9, wherein the information as to the quality of care further comprises sensor information as to whether the vehicle renter has failed to utilize a turn signal when changing lanes during the vehicle reservation in which the vehicle renter is in control of the vehicle.

14. The method of claim 9, wherein the information as to the quality of care further comprises sensor information as to whether the vehicle renter has driven while intoxicated during the vehicle reservation in which the vehicle renter is in control of the vehicle.

15. The method of claim 1, wherein the information as to the quality of care further comprises sensor information as to whether the vehicle renter has driven outside a designed geographic boundary during the vehicle reservation in which the vehicle renter is in control of the vehicle.

16. The method of claim 1, wherein the information as to the quality of care further comprises sensor information as to whether the vehicle renter has smoked or vaped in the vehicle during the vehicle reservation in which the vehicle renter is in control of the vehicle.

17. The method of claim 1, wherein the information as to the quality of care further comprises sensor information as to whether the vehicle renter has operated the vehicle while distracted during the vehicle reservation in which the vehicle renter is in control of the vehicle.

18. The method of claim 17, wherein the information as to the quality of care further comprises sensor information as to whether the vehicle renter has engaged in texting during the vehicle reservation in which the vehicle renter is in control of the vehicle.

19. The method of claim 1, wherein the information as to the quality of care further comprises sensor information as to whether the vehicle renter has broken a vehicle component during the vehicle reservation in which the vehicle renter is in control of the vehicle.

* * * * *